(12) United States Patent  (10) Patent No.: US 9,298,535 B2
Haines  (45) Date of Patent: Mar. 29, 2016

(54) METHODS FOR HIERARCHICALLY IDENTIFYING ROOT CAUSE ERRORS

(75) Inventor: Derek Walker Haines, Newark (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 230 days.

(21) Appl. No.: 14/009,844

(22) PCT Filed: Apr. 6, 2012

(86) PCT No.: PCT/US2012/032499
§ 371 (c)(1),
(2), (4) Date: Oct. 4, 2013

(87) PCT Pub. No.: WO2012/138983
PCT Pub. Date: Oct. 11, 2012

(65) Prior Publication Data
US 2014/0026002 A1  Jan. 23, 2014

Related U.S. Application Data

(60) Provisional application No. 61/473,095, filed on Apr. 7, 2011.

(51) Int. Cl.
G06F 11/00 (2006.01)
G06F 11/07 (2006.01)
G06F 11/32 (2006.01)
G06F 9/52 (2006.01)

(52) U.S. Cl.
CPC .......... *G06F 11/0769* (2013.01); *G06F 11/079* (2013.01); *G06F 11/0715* (2013.01); *G06F 11/0718* (2013.01); *G06F 11/0766* (2013.01); *G06F 11/327* (2013.01); *G06F 9/524* (2013.01); *G06F 9/526* (2013.01); *G06F 11/0757* (2013.01)

(58) Field of Classification Search
CPC ............ G06F 11/0715; G06F 11/0718; G06F 11/0757; G06F 9/524; G06F 9/526
See application file for complete search history.

(56) References Cited

U.S. PATENT DOCUMENTS

| 5,721,904 | A | | 2/1998 | Ito et al. |
| 5,974,568 | A | * | 10/1999 | McQueen ................. 714/38.13 |
| 7,240,247 | B2 | * | 7/2007 | Petri et al. ........................ 714/57 |
| 7,493,618 | B2 | * | 2/2009 | Michael ................. G06F 9/526 |
| | | | | 707/999.008 |

(Continued)

OTHER PUBLICATIONS

PCT International Search Report and Written Opinion dated Jun. 22, 2012 (9 pages).

(Continued)

*Primary Examiner* — Joseph Kudirka
(74) *Attorney, Agent, or Firm* — Pepper Hamilton LLP

(57) ABSTRACT

A method associates errors by causal relationship in software systems where multiple threads share access to hardware and/or software components. Where a software object, such as a lock, is provided, a thread can place an error ID into the object if encountered while the first thread controls the object. A second thread can retrieve the error ID and associate it as a parent error for any time-out error encountered while waiting for the software object. Errors can be reported and displayed in a causal graph for determining root causes. Errors can have a severity that can facilitate the display of errors to a user. Root cause errors can be assigned the severity of the most severe of its child errors to assist a user in determining a root cause. Errors can further be displayed or masked based on the severity assigned to the errors and/or their parent or child errors.

20 Claims, 17 Drawing Sheets

(56) References Cited

U.S. PATENT DOCUMENTS

| | | | |
|---|---|---|---|
| 7,685,573 B2* | 3/2010 | Kang et al. | 717/128 |
| 8,108,878 B1* | 1/2012 | Pulsipher | 718/106 |
| 8,245,081 B2* | 8/2012 | Colbert et al. | 714/38.1 |
| 8,359,604 B2* | 1/2013 | Duffy et al. | 719/318 |
| 8,464,221 B2* | 6/2013 | Zheng et al. | 717/124 |
| 8,751,872 B2* | 6/2014 | Khanna et al. | 714/38.1 |
| 2005/0120273 A1 | 6/2005 | Hudson et al. | |
| 2005/0289549 A1* | 12/2005 | Cierniak | G06F 9/526 718/102 |
| 2006/0123389 A1 | 6/2006 | Kolawa et al. | |
| 2007/0101324 A1 | 5/2007 | Lupu et al. | |
| 2007/0143766 A1* | 6/2007 | Farchi et al. | 718/104 |
| 2007/0174721 A1 | 7/2007 | Yamamoto et al. | |
| 2009/0105989 A1 | 4/2009 | Ramacher et al. | |
| 2009/0106327 A1 | 4/2009 | Dilman et al. | |
| 2009/0328041 A1* | 12/2009 | Sudzilouski | G06F 9/526 718/100 |

OTHER PUBLICATIONS

Jie Shen et al: "HCI2 Workbench: A Development Tool for Multimodal Human-Computer Interaction Systems", Automatic Face & Gesture Recognition and Workshops (FG 2011), 2011 IEEE International Conference on, IEEE, Mar. 21-Mar. 25, 2011, p. 766-773, XP031869349, DOI: 10.1109/FG.2011.5771346, ISBN: 978-1-4244-9140-7, *Abstract*, *p. 770, Left-Hand Column, Line 5-Line 34*.

Andrew S Lenharth et al: Recovery Domains, Principles of Programming Languages, vol. 44, No. 3, Mar. 7-Mar. 11, 2009, pp. 49-60, XP058033638, ISSN: 0362-1340, DOI: 10.1145/1508284.1508251, *Abstract*, *p. 55, Left-Hand Column, Line—Right-Hand Column, Line 18*.

Extended European Search Report dated Jul. 2, 2015 of corresponding European Patent Application No. 12767634.4, 4 Pages.

* cited by examiner

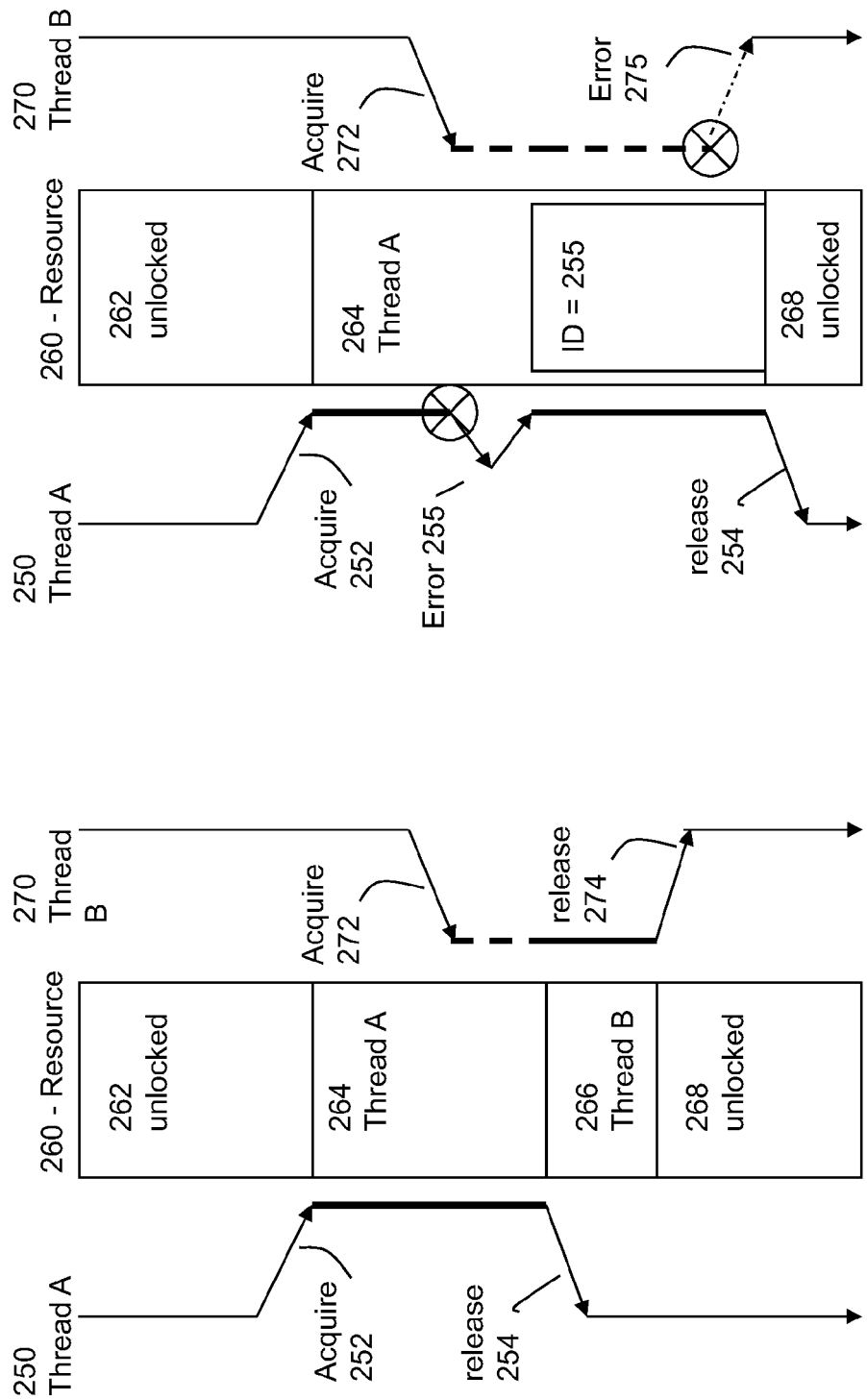

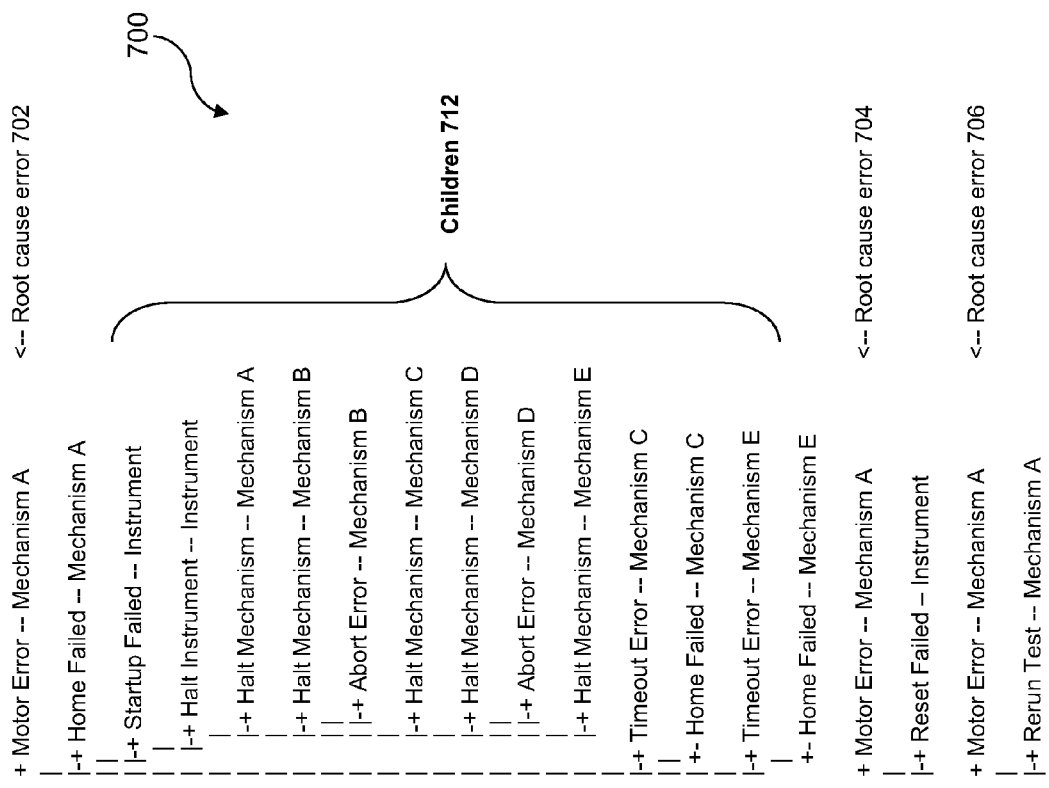

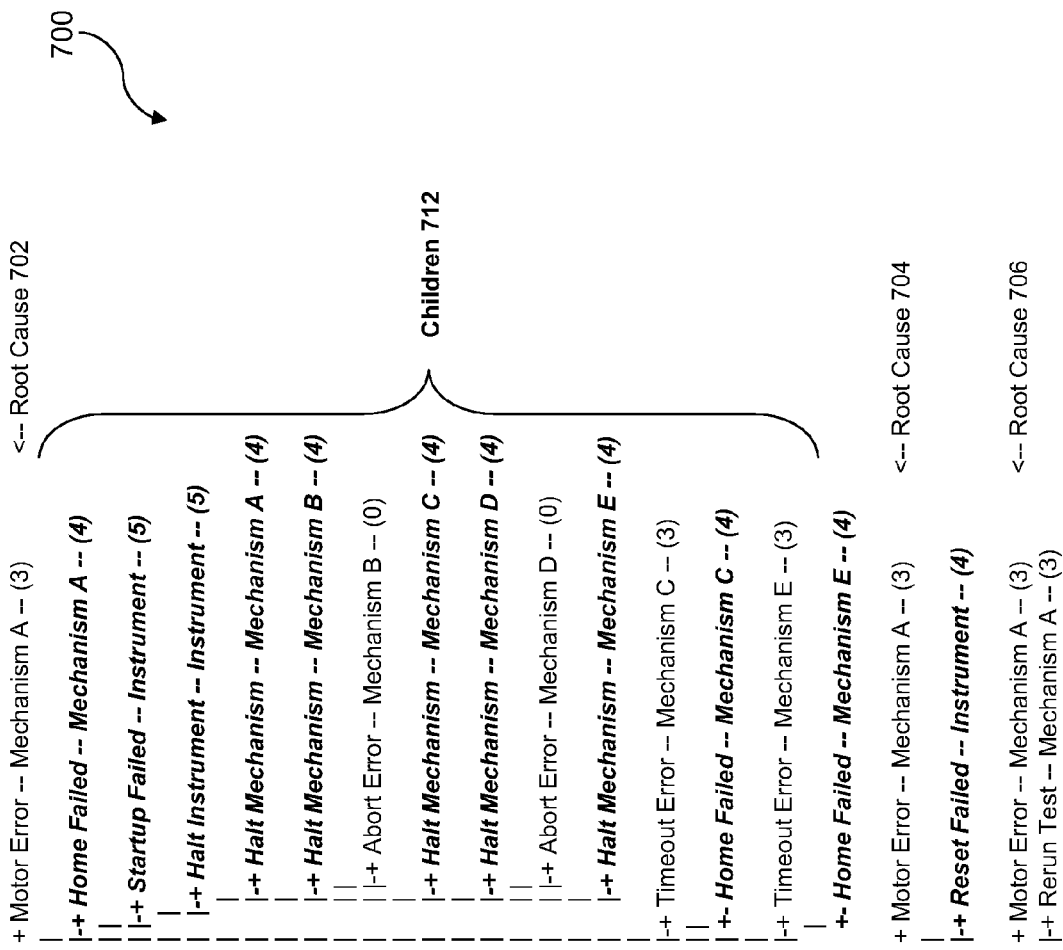

```
+ Motor Error -- Mechanism A -- (3) -- [5]           <-- 702 Severity raised due to child. Normally low severity root no longer hidden. Good.
|-+ Home Failed -- Mechanism A -- (4) -- [5]         <-- Severity raised due to child.
||-+ Startup Failed -- Instrument -- (5) -- [5]
|| |-+ Halt Instrument -- Instrument -- (5) -- [5]   <-- Severity is not changed, because child is lower severity.
|| | |-+ Halt Mechanism -- Mechanism A -- (4) -- [4]
|| | |-+ Halt Mechanism -- Mechanism B -- (4) -- [4] <-- Severity is not changed, because child is lower severity
|| | | |-+ Abort Error -- Mechanism B -- (0) -- [0]
|| | |-+ Halt Mechanism -- Mechanism C -- (4) -- [4]
|| | |-+ Halt Mechanism -- Mechanism D -- (4) -- [4] <-- Severity is not changed, because child is lower severity
|| | | |-+ Abort Error -- Mechanism D -- (0) -- [0]
|| | |-+ Halt Mechanism -- Mechanism E -- (4) -- [4]
|-+ Timeout Error -- Mechanism C -- (3) -- [4]       <-- Severity raised due to child.
|| |-+ Home Failed -- Mechanism C -- (4) -- [4]
|-+ Timeout Error -- Mechanism E -- (3) -- [4]       <-- Severity raised due to child.
| |-+ Home Failed -- Mechanism E -- (4) -- [4]
+ Motor Error -- Mechanism A -- (3) -- [4]           <-- 704 Severity raised due to child. Normally low severity root no longer hidden. Good.
|-+ Reset Failed -- Instrument -- (4) -- [4]
+ Motor Error -- Mechanism A -- (3) -- (3)           <-- 706 Root still hidden from user by default. Good, since the child is the same severity.
|-+ Rerun Test -- Mechanism A -- (3) -- (3)
```

Children 712 } 700

Fig. 7C

METHODS FOR HIERARCHICALLY IDENTIFYING ROOT CAUSE ERRORS

CROSS-REFERENCE TO RELATED APPLICATIONS

This application claims priority to U.S. provisional application Ser. No. 61/473,095 filed Apr. 7, 2011, which is incorporated herein by reference in its entirety.

TECHNOLOGY FIELD

The present invention relates in general to methods for utilizing software that interacts with hardware for reporting errors encountered by the hardware. Embodiments of the present invention are particularly well suited, but in no way limited to, software for reporting causal relationships between errors in components and software for determining root cause errors in software controlled electrical or mechanical systems, such as diagnostic test equipment and instruments.

BACKGROUND

In software systems that interact with real-world hardware components, errors are often difficult to trace to a root cause. An error encountered by software interacting with one hardware component may cause a number of subsequent follow-on errors in other components or software modules interacting with these hardware components. In a software/hardware system that is capable of recording or displaying errors, multiple errors may be generated across a variety of internal subsystems in response to a root problem with the hardware or software module that encountered a problem. Displaying these multiple related errors and associating them in a meaningful way can be a difficult problem.

In order for an operator or service engineer to successfully diagnose and resolve the overall problem in the system, the operator needs to determine the originating root cause error and treat it. The follow-on errors that may be generated from a root cause error are generally not important when diagnosing and treating the overall problem. However, in many prior art systems, the resulting errors are displayed to the operator, regardless of whether they are a likely root cause or not, in an unarranged, undistinguished fashion alongside the original root cause error. This problem may even exist where the systems have a means for associating errors.

There is often no simple way for the operator or engineer to distinguish which error is the root cause and which errors are follow-on errors (e.g., those that are often less important from the stand point of solving the problem—merely symptoms that result from the root cause error). The operator often needs to guess the root cause error based on other information such as error timing, experience, complex log files, or luck. This guesswork can be time-consuming and costly for the operator and/or service engineer and is often detrimental to the reliability of the hardware/software system.

In some systems, certain errors may be considered more critical than others. For example, an error that results in a total system shutdown and significant loss of productivity may be considered more severe than a simple timing error that results in a minimal loss of productivity. However, in many prior art systems, the overall severity of the root cause error may not be known until the follow-on errors are generated and manually correlated by the operator back to the root cause error. Particularly in systems where errors of lesser initial severity can be automatically hidden from the operator, it may be difficult to determine that an error that was hidden due to low severity is actually a root cause error of significance if it is not associated with more severe follow-on errors. For example, it may not be possible for the instrument to display a particular root cause error to the operator if the system does not determine the error is severe enough. Many prior art systems typically lack knowledge about the causal connections within a group of errors and this frequently prevents the true severity of the originating error from being known.

There is a need for a system that automatically determines the causality between a group of errors. Such a system that reliably solves this problem has previously been considered extremely difficult if not impossible. While conventional systems can easily determine causal links in some cases, other cases were considered too difficult or had no known solution. In order for error-causality systems to be useful, they must be able to determine the common causalities that occur. This may be difficult if the software in the system has not been designed with this goal in mind. In particular, establishing the causality of software thread time-out errors (e.g., a software thread timing out on a lock held by another thread that is processing a different error) has been a difficult problem in system design.

An example of a system where this need exists can be found in U.S. Pat. No. 7,381,370, assigned to the assignee of the present application and incorporated herein by reference. In complicated instruments, such as chemical analyzers, which may include a number of precisely moving parts, a root cause error may be simple in the real world but difficult to determine in software. For example, if a servo motor has become worn or stuck, it may result in errors in other mechanical portions of the instrument that interact with the motor. There is a specific need in chemical analyzers, medical devices, or other complex software/mechanical instruments to provide software mechanisms that simplify, repair, and diagnose when errors occur in the system.

The present invention provides software mechanisms that facilitate the association of errors to assist in the determination of root cause errors versus follow-on errors. The present invention also provides software mechanisms to facilitate simplified displaying of errors to assist operators in determining root cause errors.

SUMMARY

Embodiments of the present invention address and overcome the above shortcomings and drawbacks by providing improved methods for identifying parent-child relationships among errors. By associating errors by a causal relationship, errors can be displayed as graphs or trees. In addition, improved methods of assigning severity levels to errors within the graph allows for simplified filtering of less severe errors, without masking likely root cause errors. This technology is particularly well-suited for, but by no means limited to, software systems for interacting with hardware systems, such as diagnostic test equipment and instrumentation.

Embodiments of the present invention are directed to a method for reporting errors in a software environment including a first step of generating a first error by a first software thread, including a first error ID, in response to a first error condition relating to the state of at least one resource. The method further includes propagating the first error ID to at least one second software thread, generating a second error by the second software thread, including a second error ID and the first error ID, in response to a second error condition relating to the state of at least one resource, and reporting the first and second errors to a user.

According to one aspect of the invention, the method for reporting errors further includes the step of reporting the errors to a user interface. According to another aspect of the invention the first and second IDs comprise unique identifiers. According to a further aspect of the invention, the method for reporting errors further includes propagating the first error ID to at least one third software thread, generating a third error by the third software thread, including a third error ID and at least one of the first or second error IDs, and reporting the third error to the user.

According to one aspect of the invention, the step of propagating the first error ID includes updating an attribute in a software object that is accessible to both the first and second threads. According to another aspect of the invention, a software object includes a lock, such that only one of the first and second threads can control the resource at any given time.

Embodiments of the present invention are directed to a method for reporting errors in a software environment, including requesting, by a first software thread, access to a shared resource guarded by a software object controlled by a second software thread. The method further includes determining whether a time-out condition has occurred while the first thread is awaiting access to the shared resource, generating an error in response to the determining step, including a first error that includes a first error ID, obtaining from the software object a second error ID associated with the second thread, and associating the first and second error IDs. The method can then report the first error along with an association between the first and second error IDs to a user.

According to one aspect of the invention, reporting errors includes reporting the errors to a user interface. According to another aspect of the invention, the first and second IDs are unique identifiers. According to a further aspect of the invention, the method for reporting errors further includes updating information in the software object, by the second thread, to include the second error ID when the second thread encounters an error while the second thread has control over the software object.

According to one aspect of the invention, the software object is a lock, such that only one of the first and second threads can control the hardware resource at any given time. According to another aspect of the invention, the software object is an object that propagates a signal from the first thread to the second thread upon completion of an instruction sequence by the first thread. According to an additional aspect of the invention, the shared resource is a shared hardware and/or shared software resource.

Embodiments of the present invention are directed to a method for displaying errors to a user, including gathering a plurality of errors representing hardware or software error conditions. The method further includes associating the plurality of errors into a graph to convey causal relationships amongst the errors, including at least one parent error and one or more child errors and displaying the graph of errors to a user. Causal relationships can be determined based on identifiers within the errors.

According to one aspect of the invention, each error has a predetermined severity. According to another aspect of the invention, the method for displaying errors to a user further includes determining a severity of each of the plurality of errors and displaying those errors that have a severity above a threshold. According to a further aspect of the invention, at least one parent error is displayed where at least one of the one or more child errors exceeds the threshold. According to yet another aspect of the invention, a parent error can be assigned the highest level of severity determined for the one or more child errors. According to a further aspect of the invention, one or more child errors are masked when an assigned severity of a parent exceeds an assigned priority of the child error.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3A is a timing diagram illustrating the competition between threads for a shared lockable resource;

FIG. 3B is a timing diagram illustrating the competition between threads for a shared lockable resource resulting in generation of exemplary errors;

FIGS. 7A-7D are exemplary tree graphs illustrating the relationships between exemplary errors in accordance with illustrative embodiments;

DETAILED DESCRIPTION OF ILLUSTRATIVE EMBODIMENTS

Figure 1B:
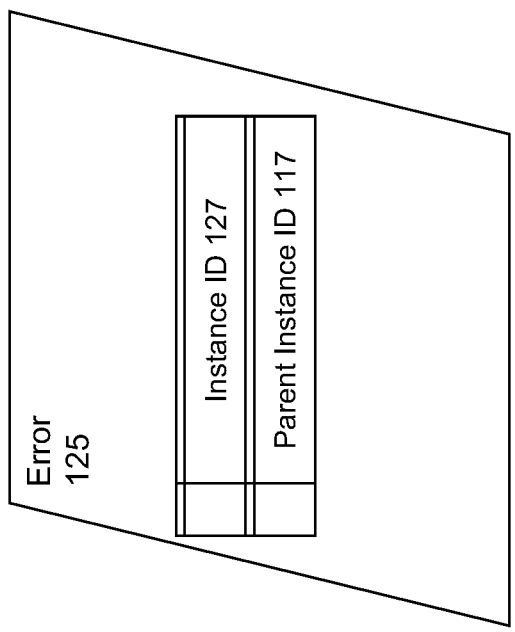
FIG. 1B is a data diagram of an exemplary error.

The above problems and shortcomings in the prior art have motivated the creation of methods for identifying the causal relationships (described herein as "parent-child" relationships) between errors encountered by software or hardware in a system that includes multi-threaded software and shared resources. Exemplary resources can include sensors, electromechanical components or subsystems, or any other resource that may be shared amongst threads. Threads pass information about errors encountered to the shared resources or to other threads so that subsequent errors can associate the passed information with the cause for subsequent errors.

An instrument, such as chemical analyzer, includes software that interacts with, and controls, mechanical components. An exemplary system of a chemical analyzer that uses software control is described in detail below. An exemplary instrument containing a software/mechanical system can include the Dimension® clinical chemistry analyzer sold by Siemens Healthcare Diagnostics Inc. of Deerfield, Ill.

An exemplary software/mechanical system can include multiple threads that interact with software objects. These objects can model or control hardware components in the system. For example, a motor in the system may be represented by one or more software objects that can be controlled or interacted with by the threads in the system. The software object may include drivers or other control mechanisms for controlling a hardware component; the object may further include data representing the real-world state of the component or sensor information. Within the system, multiple threads may need to interact with the hardware component and, more particularly, the software object representing the hardware component. These threads may include, for example, different control routines within the system. For example, a thread may include the routines necessary for a procedure that uses multiple components and hardware/software systems, such as a homing routine. These may include startup and diagnostic routines or routines that run frequently in the system. Other threads can include:

(1) Individual threads can drive a selected set of hardware through normal operations. For example, a single thread to deliver patient sample via a probe to a cuvette, another thread to deliver reagent to the same cuvette via a different probe, and another thread to drive the hardware detector to take readings on the patient sample in the cuvette.

(2) Higher level threads can coordinate the activities of global operations in the instrument, in particular startup, and shutdown activities, or global transitions into halted or diagnostic states. For example, these higher level threads can issue commands to the lower level hardware threads to perform certain actions on their associated hardware like "home" or "stop" and may or may not wait on results, including errors, before proceeding to other actions.

(3) Some embodiments may not use dedicated threads per hardware component, and may employ software objects that represent hardware to acquire or spawn threads on demand when hardware/software actions need to be taken.

(4) Threads can maintain a system scheduler. These can schedule hardware and software activities in the system that other threads execute. The scheduler threads may or may not generate errors depending on the availability and state of required hardware in the system.

(5) Hardware calibration threads can be used during system setup and/or diagnostics.

(6) Diagnostic routine threads can be used during diagnostic operation.

(7) User interface threads can facilitate initiation of actions by the user, which can eventually be transformed into commands to lower level threads to execute hardware actions.

Objects or threads can include error handling routines. When a thread encounters an error, it can report this error via these handling routines. Error handling routines can include sending a notice of the error to a log file, display, or any other useful repository of error information and may include predetermined routines such as returning the system to a known state or attempting the routine that encountered the error again. Error handling can include creating one or more objects that represent the error. They can also include modifying attributes of an existing object representing one or more errors. By utilizing an object oriented approach, some embodiments are able to more easily associate multiple errors with a common cause and propagate information between related errors.

An error can include a problem encountered by hardware or software. An exemplary type of error can include determining that a hardware or software state differs from an expected state. In some embodiments, errors may be represented using a common format, such as a structure or object that allows the system to handle hardware and software errors in similar fashion. In some embodiments, errors encountered by hardware can be treated separately from errors encountered by software. Parent child relationships can be created between hardware and/or software errors. It should be noted that in many systems in which the present invention can be employed, hardware errors can cause software errors, and vice versa. Accordingly, it will be appreciated that the decision to treat hardware and software errors the same or separately can depend on the type of system employing the present invention.

One common method in the prior art for reporting errors includes storing error codes associated with an error and may include storing a timestamp indicating the system time when the error occurred. In systems where error reporting may be delayed, or where an operator reviews errors, a timestamp may be useful for associating errors. However, relying on timestamps can be misleading. For example, where an error is caused by interaction with a real-world device, related errors may not be noted by the software at the same time and related errors may have different timestamps. Complicating the matter, the root cause error may not be the error with the earliest timestamp. Timestamps, however, may still be useful to the operator and can be displayed in some embodiments of the present invention.

Errors often result in a related chain of errors. To facilitate association of errors within the same chain, some embodiments utilize an error model where each error includes multiple attributes. A first attribute can include a unique serial number associated with this particular error. A second attribute can include the serial number that identifies a parent error. A parent error, as used herein, is an error that is determined to be the cause of the present error. Likewise, a child error is an error that is determined to be caused by the present error. For example, a parent error might include a motor encoding error, while a child error may include the resulting positional encoding error. For ease of reference, the serial number of the present error can be referred to as the "instance ID," while the serial number of the parent error can be referred to as the "parent instance ID." It should be appreciated that the parent instance ID can include a serial number and could additionally or alternatively include a pointer to a parent error.

In some embodiments, each new error is handled by creating a new error object including instance ID and parent instance ID attributes. Other attributes may include, for example, the type of error, the timestamp of the error, the severity of the error, the thread ID that instantiated the error, the hardware or software associated with the error, or any other information that may be useful for reporting the error to an operator of the system.

There are a few general types of error situations that may be encountered by embodiments of the present invention. A first situation 100, shown in FIG. 1A, includes more than one error that is created by the same object or thread. For example, during a homing function 102 (and by extension routines or processes 110 performing the homing function 102), an "in motion mismatch" error 115 (e.g., positional sensor information disagrees with an expected result) may be detected by a homing function. The "in motion mismatch" error 115 may be created by a process 110 carrying out the homing function 102. The error handling routine (e.g., exception handling routine 120) in the thread may respond to the "in motion mismatch" error by creating a new "homing failed" error 125. To associate the "in motion mismatch" error 115 with the "homing failed" error 125, the routine 120 creating the "homing failed" error 125 can include reference to the "in motion mismatch" error 115 as the parent error. Accordingly, the "in motion mismatch" error may have a first instance ID 117 while the "homing failed" error may have a second instance ID 127 and a parent instance ID 117.

FIG. 1B shows an exemplary error 125, including the attributes used to identify the current instance ID 127, which refers to the unique serial number of "homing failed" error 125, and the parent instance ID 117, which refers to the instance ID of the "in motion mismatch" error 115. As noted previously, parent instance ID 117 could include a pointer to the in motion mismatch error 115 object or a serial number identifying that error. In addition to the unique instance ID, the error can include other (e.g., generally non-unique) information to identify the type of error, such as "in motion mismatch, code 32."

Figure 1C:
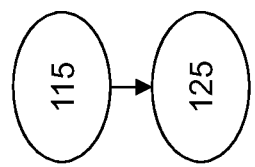
FIG. 1C is a graph illustrating the relationship between related errors.
Figure 1A:
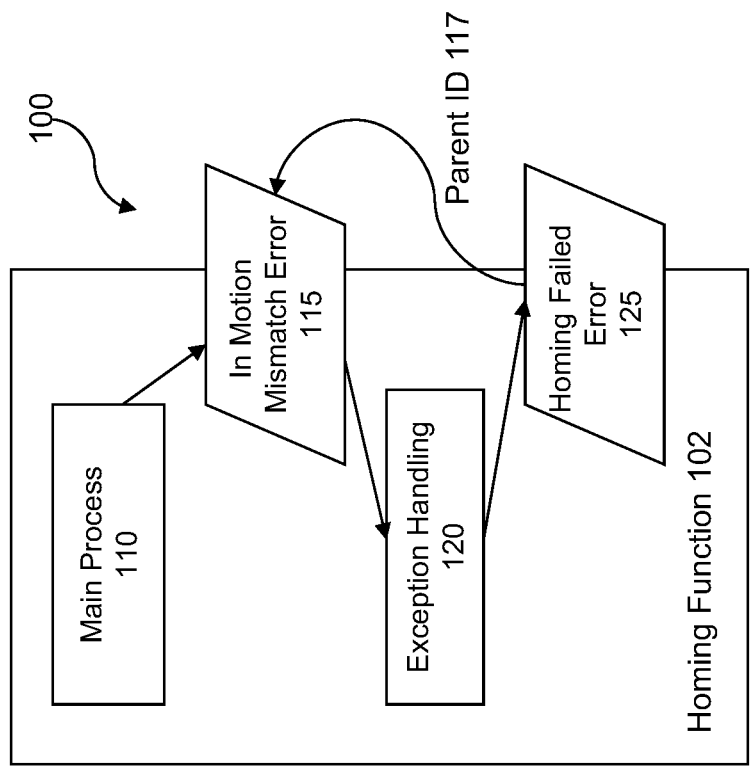
FIG. 1A is a dataflow diagram illustrating generation of exemplary errors.

FIG. 1C shows a simple tree graph depicting the lineage of the homing failed error 125. Because there is only one parent and one child, the tree graph is very simple with a single parent child relationship between error 115 and error 125. It will be appreciated that if more than one error results from error 115, there could be multiple children. Children of those errors can result in further branching to grandchildren. Furthermore, where there is no known association between errors, there may be more than one error in the graph without a parent. The parents represented in the graph indicate possible root cause errors.

Figure 2B:
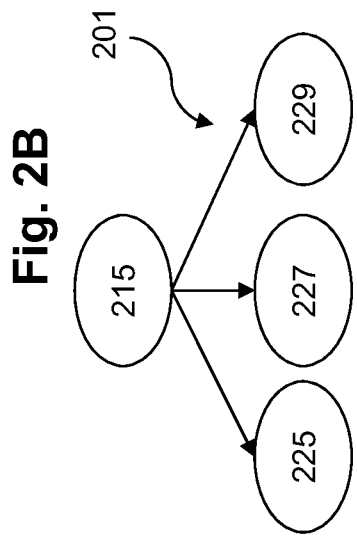
FIG. 2B is a graph illustrating the relationship between related errors.
Figure 2A:
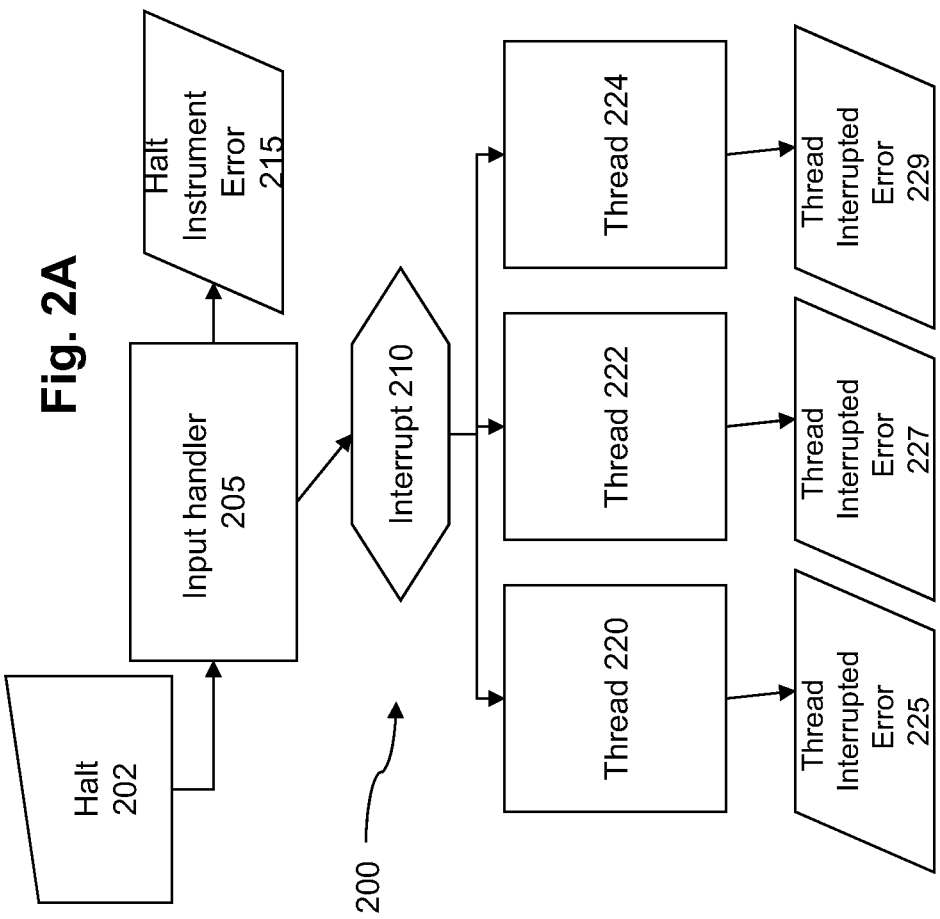
FIG. 2A is a dataflow diagram illustrating generation of exemplary errors.

A second situation 200 that may be encountered is a "top down" error, shown in FIG. 2A. For example, where some important event occurs, such as an operator sending a halt instruction, an error may be created, such as a "halt instrument" error. In response to this input, some systems within the system may be halted and subsequent errors generated in response to an abort signal. When a user interface generates a halt signal 202, input handler 205 creates a halt instrument error object 215. The input handler 205 may also generate an interrupt 210, which is sent to multiple threads operating in the system such as threads 220, 222, and 224.

Multiple threads (e.g., 220, 222, and 224) that are operating within the system may create "thread interrupted" errors (e.g., 225, 227, and 229) as part of an error handling routine. In this scenario, without associating the "halt instrument" error 215 as a parent error to the resulting errors, such as "thread interrupted" errors 225, 227, and 229, it may become difficult to later determine a root cause error (e.g., the "halt instrument" error 215). To solve this, when creating the "thread interrupted" error 225, the thread 220 may assign attributes that include the parent instance ID of the "halt instrument" error 215 and a new instance ID for the current "thread interrupted" error 225. This allows the system to associate many errors easily with a single root cause parent error.

This concept is shown in FIG. 2B. FIG. 2B shows the resulting graph 201 of the parent-child associations between halt instrument error 215 and thread interrupt errors 225, 227, and 229. Because each thread interrupt error includes the parent instance ID of halt instrument error 215, graph 201 can be easily created by the user interface without requiring additional information. As can be seen from graph 201, error 215 is the only parent error. This allows an operator to easily determine from the error information that error 215 is the likely root cause of the errors encountered. While this example may seem trivial, it will be appreciated that this concept can scale easily to large numbers of associated errors that may have multiple levels of children.

Including the parent ID for a "top-down" error can be further facilitated by including an instance ID associated with the source of the interrupt signal in the interrupt signal. For example, when the interrupt is represented by an interrupt object 210, the interrupt object 210 may include an attribute that identifies the instance ID of the error 215 associated with the creation of the interrupt object 210. As a result, thread interrupt code (e.g., routines in threads 220, 222, and 224) that watches for interrupt signals can extract the instance ID of the error that caused the interrupt. The error handling routine responding to the interrupt can then include the instance ID (recovered from the interrupt signal) as the parent instance ID of a resulting "thread interrupted" error.

A third situation includes time-out errors. Time-out errors have traditionally been among the most difficult to associate for determining the root cause. An exemplary time-out error might include a "locks not cleared" error. For example, a first thread, thread A, may have control of a software lock associated with a hardware device or other resource, such as a memory device. A second thread, thread B, may be waiting to use this resource and may be waiting to acquire control of the software lock associated with the resource or device. If thread A encounters an error while controlling the lock and consequently does not release the lock in a timely manner, then thread B may be left waiting for thread A to release control of the software lock for the hardware device. Thread B may encounter a time-out condition. As a result, thread B may generate an error to avoid idling indefinitely while waiting for the lock to become available. Accordingly, thread A and thread B may both generate errors that occur at different system times. Traditionally, there has been no obvious way to associate these two errors. Embodiments of the present invention provide a method for associating errors generated by multiple threads having a causal relationship. This can enable the creation of a parent-child relationship between the error generated by thread A and the error generated by thread B. This can facilitate the determination of a root cause for errors occurring in multiple threads due to timing errors.

This concept can be illustrated with respect to FIGS. 3A and 3B. FIG. 3A shows a timing diagram of an exemplary multithreaded system operating properly. Thread A 250 and thread B 270 share a common resource 260. An example of the situation may include a system where thread A includes a homing routine for a subsystem that includes access to resource 260 among the many resources. Resource 260 may be a model for a mechanical subsystem such as a robot arm. Thread B 270 may be in a routine that performs a motion task, such as moving various mechanical systems including the robot arm represented by resource 260 to perform an action. In this example, thread A may need to utilize the robot arm. It may be important to the routine being executed in thread A that no other threads control the robot arm during the homing routine. For example, a homing routine may require that multiple mechanical devices work together in concert. Therefore, it may be critical that other threads do not control the multiple mechanical devices necessary to carry out the routine in thread A.

The middle column in FIG. 3A represents the state of a software locking mechanism available in resource 260. Prior to thread A seeking control of resource 260, resource 260 may be in an unlocked state 262. While in its unlocked state, resource 260 may be available to any thread seeking control on a first-come-first-served basis. When thread A seeks control of resource 260, it may notify resource 260 of its intent to lock the resource via an "acquire" message 252. Upon receiving the acquire message 252, resource 260 may lock the resource to give exclusive control to thread A, as shown in section 264. Examples of the transition between unlocked state 262 and a locked state 264 can include setting an attribute in a lock object identifying thread A as having exclusive control or any other conventional method.

While thread A has control of resource 260 and the lock of resource 260 is in a locked state 264, another thread, such as thread B, may seek to acquire a lock and permission to use resource 260. For example, where thread B seeks to perform a motion task using the robot arm associated with resource 260, thread B may notify resource 260 of its intent to use the resource exclusively by sending an "acquire" message 272. Resource 260 may notify thread B that it is currently unavailable (such as by not responding to the acquire message 272 until resource 260 has been locked for use by thread B or by sending a "wait" instruction).

Thread A releases resource 260 when it is finished using the resource. In some embodiments, thread A actively releases the lock state 264 on resource 260 by sending a "release" message 254. It should be noted that in some embodiments, resource 260 could perform operations at the direction of thread A and release the lock 264 automatically upon completion by changing the state of the lock and sending a release notification (e.g., task complete message) to thread A. If other threads are waiting to lock or use resource 260, resource 260 can determine which threads have pending acquire requests, such as request 272, and assign control to the chosen waiting thread. During period 266, the lock is assigned to thread B, such that thread B is no longer waiting and can perform whatever tasks it was waiting to perform. Upon completion, thread B releases the lock from the locked state 266 in the same manner as thread A, such as via a "release" instruction 274. Resource 260 then returns to an unlocked state (e.g., 268) where there are no other threads waiting for control.

FIG. 3B shows an example of a timing diagram for the same system when a time-out error occurs in thread B, because thread B was unable to acquire a lock on resource 260 before a predetermined time limit, while waiting for control. In this example, after thread A has acquired a lock on resource 260, thread A encountered an error that prevents it from completing the desired operation. For example, where thread A is performing a homing routine that requires multiple moving components to operate together, thread A may encounter an error with some other component, such as a non-responsive sensor or another thread, or may simply have been unable to acquire locks on all components needed (e.g., thread A encountered a time-out error, like that subsequently encountered by thread B). It may not be practical for thread A to simply release its lock on resource 260 (such as during an error with the position components that physically interact with resource 260). Accordingly, resource 260 may be held in a locked state 264 for an extended period of time as a result of an error encountered by thread A. Threads waiting for resource 260, such as thread B, may throw an error in response to a time-out condition while waiting for resource 260.

In this example, thread A encounters an error condition while it has control of the lock of resource 260, causing thread A to create an error 255. This error may include a parent instance ID if caused by another error or event, and includes a unique instance ID (e.g., 255). In prior art systems, thread A and thread B might have no way of knowing about one another if they do not directly interact. While they compete for a common resource, they may not have any paths of communication. Without some manner of passing error information to other threads that may be waiting to use resource 260, resulting time-out errors may not easily be associated with error 255, which may be the root cause (or at least a cause) of these subsequent errors.

To facilitate an association between error 255 and any resulting time-out errors generated in other waiting threads, thread A passes information to the lock in resource 260. Where the lock is an object, thread A may simply set an attribute dedicated to propagating error information. Upon encountering (or creating) an error 255, thread A may set an ID value within resource 260 (or a lock object associated with resource 260) to include information about error 255, such as the error's instance ID (255). In some embodiments, the information passed to the lock may include any parent instance IDs associated with error 255.

Upon encountering a time-out condition, thread B may create an error 275 to report this condition. In prior art systems, thread B may not have known of any parent errors that caused the time-out error. As a result, time-out errors would not be associated easily with the other errors that caused the time-out. In the scenario shown in FIG. 3B, upon creation of error 275, thread B can get the ID of error 255 that thread A stored in the lock and include the ID (255) as the parent instance ID of error 275. This allows a parent-child relationship to be created for the time-out errors 255 and 275.

If thread B controls any locks that cannot be released, thread B can propagate its error information in the same way as explained for thread A. For example, if thread B had acquired a lock to another resource while waiting for resource 260, thread B can update an error ID attribute in that other resource so that threads waiting for that resource can subsequently include a parent relationship to error 275. In some embodiments, thread B will propagate the instance ID of error 275 to the resources it has locked. In these embodiments, the resulting error tree will be multi-level, with error 255 as a grandparent of errors created by any threads waiting on resources locked by thread B. In some embodiments, thread B can additionally or alternatively propagate the parent instance ID (255) to those held resources. In these embodiments, the resulting error graph will be a flatter tree with subsequent errors appearing as children of error 255, rather than error 275. In either scenario, error 255 will be deduced as a cause of all the resulting errors. Error 255 can be considered a potential root cause where it has no associated parent errors.

Eventually, thread A may be able to recover from error 255 and complete its exclusive use of resource 260. For example, where thread A experienced a time-out error on another resource needed to complete the use of resource 260, thread A may have subsequently acquired that other resource, enabling thread A to complete its task. Upon completion of thread A's use of resource 260, the resource moves into an unlocked state. At that point, the error ID (255) can be cleared, as error 255 should no longer cause an unresolved lock of resource 260. This prevents subsequent threads from discovering a stale error ID and misinterpreting error 255 as a cause of the subsequent error.

In some embodiments, threads acquiring a lock to resource 260 can place their thread ID information in the lock object. This can allow subsequent time-out errors that may be encountered by other threads to include the information about the thread that controlled the lock at the time of the time-out. This information can be useful in determining what caused the error where thread A did not experience an error 255, but thread B nonetheless encountered an error 275. In this example where error 275 is considered a root cause error candidate, the information about the state of the lock to resource 260 can be propagated as part of an error reporting scheme, and can be useful in determining what caused the error 275.

Figure 4A:
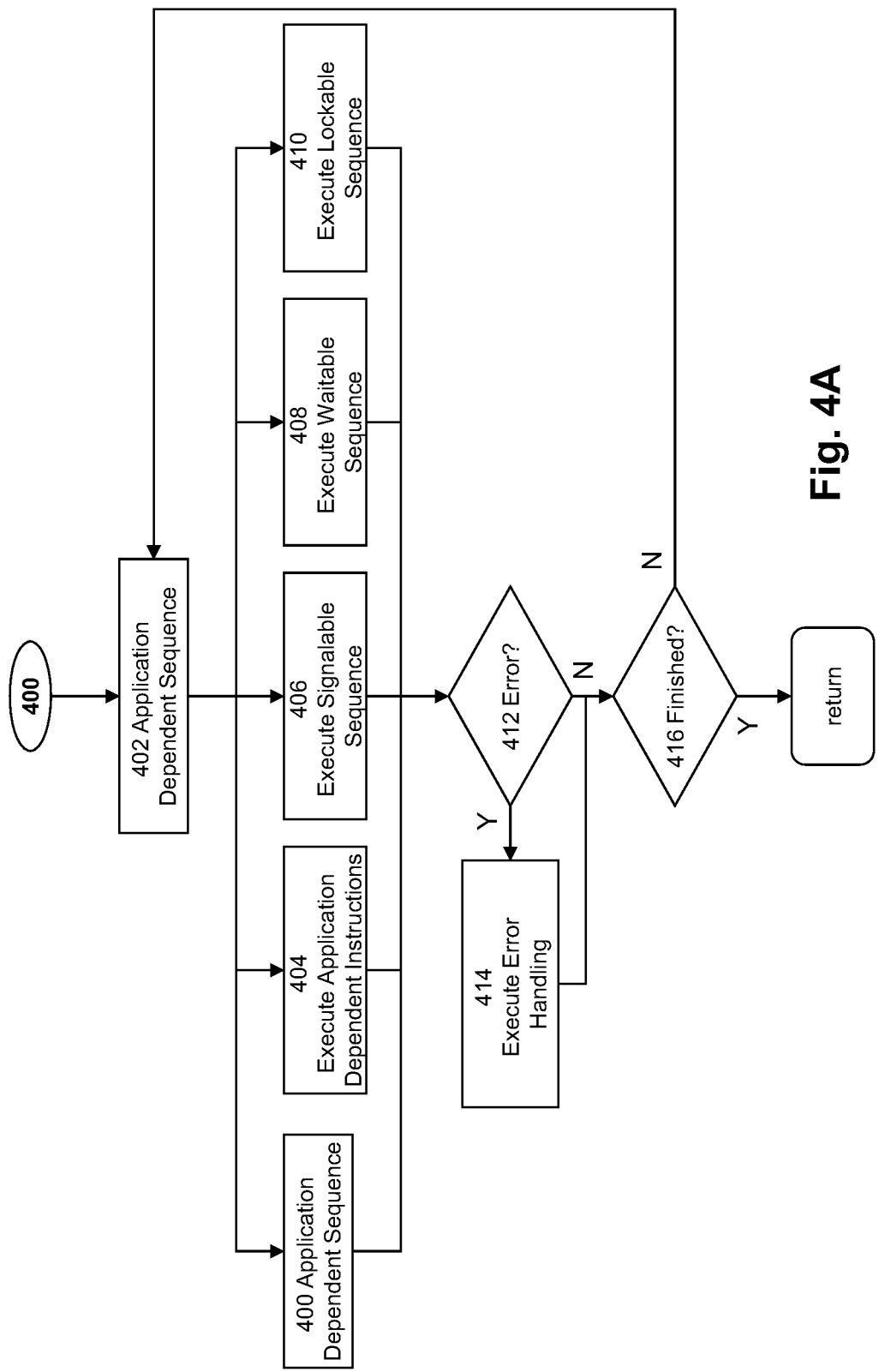
FIGS. 4A-4E are flow charts illustrating algorithms for executing functions and generating errors in accordance with illustrative embodiments.

FIGS. 4A-4E describe an illustrative embodiment of the method that threads can use to propagate and associate errors. FIG. 4A shows a top level process 400, the application dependent sequence. This can be considered a single unit of work within a thread. An application dependent sequence includes the instructions for performing a task during one cycle of operation. Application dependent sequences can be defined recursively, such that the sequence includes one or more other application dependent sequences as part of the unit of work. For ease of reference, the current thread executing the sequences shown in FIGS. 4A-4E will be referred to as thread A. Other exemplary threads, such as thread B, also may use the methods disclosed in FIGS. 4A-4E.

At step 400, thread A enters a new application dependent sequence. At step 402, the application dependent sequence is determined. Particularly, step 402 determines what type of application dependent sequence must be executed. This determination may result in a recursive branch to an application dependent sequence 400. This determination may also result in the execution of application dependent instructions 404 that are defined in the code being executed. The application dependent instructions executed at step 404 can include any number of instructions chosen to carry out a task by the thread. The determination at step 402 can also result in the execution of a signalable sequence 406, execution of a waitable sequence 408, or execution of a lockable sequence 410. Each of these sequences can make further recursive calls to application dependent sequences 400. Upon completion of the execution step, the application dependent sequence determines if an error has been returned by an execution step, at step 412. If an error has been returned, the sequence will execute error handling 414. Upon completion of error determination and error handling, the application dependent sequence will determine if further execution is needed at step 416. If further execution is needed, the sequence repeats beginning with determining the application dependent sequence to be executed at step 402. Otherwise, the application dependent sequence finishes and returns.

The various sequences that can be executed depend on the type of object being interacted with by the application dependent sequence 400. There are two primary types of objects that are of interest to the sequence shown in FIG. 4A, which may generally be referred to as waitable objects. A waitable object is an object that may cause one thread to wait on the execution of another thread, and can accordingly be a facilitator of time-out errors. A first type of waitable object is a signalable object. A signalable object is an object that allows one thread to pass information to another thread. For example, one thread may need an execution result from another thread. The threads may pass information via a signalable object that allows the execution result to be passed from one thread to another. In some instances, one thread may be sending information via a signalable object while another thread is waiting for the result to be passed via the signalable object. In some instances, the thread that is waiting may be sitting idle while waiting for the result. Accordingly, while signalable sequence 406 is executed by a first thread (e.g., the thread passing information to another thread) the other thread may be executing waitable sequence 408 and waiting for the signal from the first thread.

Another type of waitable object is a lockable object, such as resource 260 (FIGS. 3A and 3B). Threads may interact with this lockable object by requesting and acquiring a lock to the object, performing tasks while holding the lock, and releasing the lock upon completion. Threads interacting with a lockable object will execute a lockable sequence 410 to interact with the object.

Threads can maintain a registry or list of all waitable objects and/or threads that should be alerted in the event of an error. For simplicity, this registry will be referred to herein as the intent registry. The intent registry can be used by threads to complete a signalable sequence or a lockable sequence, or to track resources that should be used to propagate errors to other threads that may be affected by the completion of a signalable or lockable sequence. For example, in the case where thread A encounters an error while holding a resource, thread A sets an error instance ID on the resource. Thread A can determine which objects to set an error instance ID on by examining an intent registry. This can be done even when no other threads are currently waiting on the resource. When thread A releases the resource, it clears the error instance ID. In the case where there are no other threads waiting on the resources, thread A's error instance ID will not affect any other thread and has no effect on other errors because no other thread uses the resource during this time period. Setting and clearing the ID on a resource when an error occurs is an unobtrusive action when no other threads wait on the resource. Setting the ID even when no threads wait on the resource can be a proactive measure for the case that one or more other threads end up waiting on the resource in the future.

The intent registry can be separate for each thread and maintained by each thread, or may include a common registry that is updated by actions of the plurality of threads that use the common intent registry. In some embodiments, the intent registry can include a supervisor thread that facilitates the maintenance of the intent registry. Actions using the intent registry can include adding an association of a thread's intent and a target object (e.g., the intent to signal a signalable object or the intent to lock/unlock a lockable object); unregistering the association (e.g., removing the intent to signal/lock/unlock, such as after completion of the intended action); or querying the intent registry for associations, such as during error reporting or diagnostics to determine error causality.

The intent registry can be implemented in any appropriate form for the application, such as a list, linked list, array or vector, database, or the like, and can reference objects via IDs or pointers. For example, the intent list can include a common database of waitable objects referenced and searchable by an associated thread ID. In some embodiments, the intent list can include a storage list of waitable objects that is local to each thread. In some embodiments, the intent registry can include uphill and downhill relationships between threads and waitable objects, meaning, the intent registry can include the waitable objects that are waiting to be signaled or unlocked by the thread, as well as the waitable objects that the thread is waiting on to become available or to send a signal to the thread. Accordingly, the intent registry can be used to determine which objects (or threads) thread A intends to signal/lock/unlock, or which threads intend to signal/lock/unlock a given resource. The intent registry can include one-to-one, one-to-many, and/or many-to-one relationships, as appropriate.

Figure 4C:
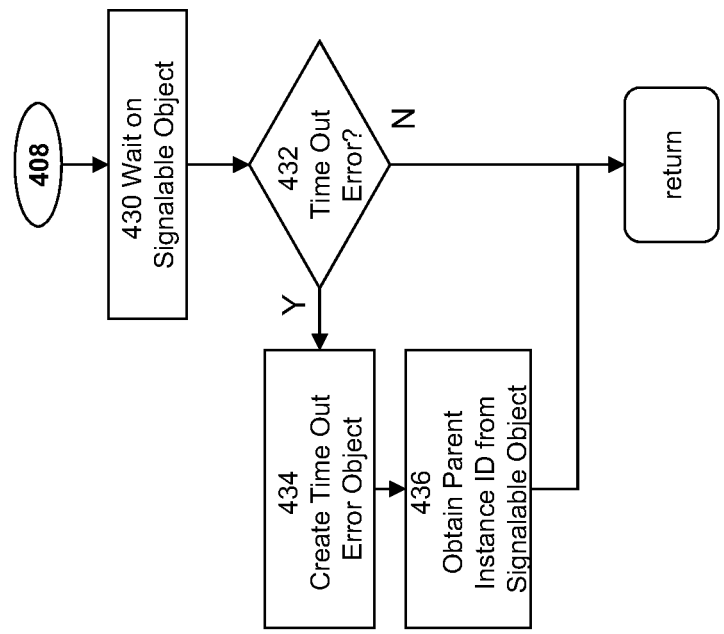
Figure 4B:
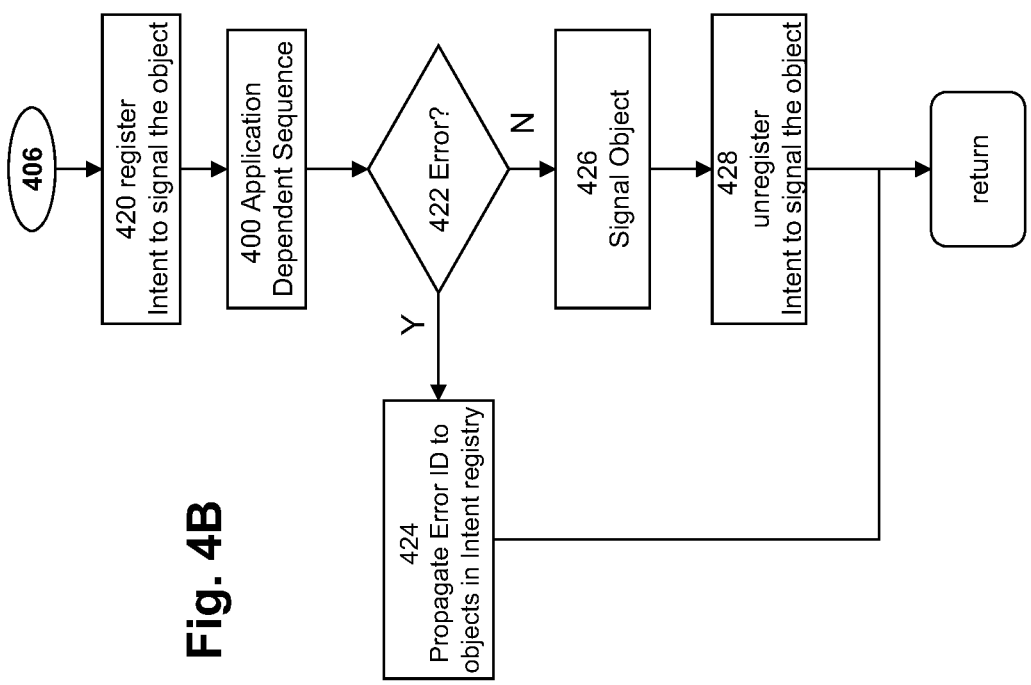

Signalable sequence 406 is shown in FIG. 4B. Thread A, executing a signalable sequence, updates or maintains an intent registry to include the list of objects to signal. In some embodiments, this can be a subset of an intent registry, which also includes a list of objects to unlock, that is associated with thread A. Signalable sequence 406 represents a unit of work performed by the software where the signal will be sent via a signalable object to one or more other threads after successful completion of the work. A signalable sequence generally performs an application dependent sequence 400 to perform the work. If the application dependent sequence called by the signalable sequence encounters an error, then the expected resulting signal may not be sent. If this signal is not sent, other threads relying on the signal may encounter their own errors because they failed to receive an expected signal. Accordingly, signalable sequence 406 takes steps to facilitate the association of those subsequent errors with the error encountered in signalable sequence 406.

Execution begins at step 420, where thread A identifies the object to be signaled and registers its intent to signal the signalable object in the intent registry. This enables thread A to propagate any error encountered to objects that may be used by peer threads where the failure to timely signal the object may cause time-out errors in peer threads. The intent registry can also be used to identify the signalable object or objects that should be signaled upon completion on the signalable sequence.

Registration at step 420 may include sending information to the lockable object or may include recording (e.g., by ID or by pointer) the lockable object in a list of objects that the thread intends to signal (e.g., the intent registry and/or other data structures). By adding the objects that are expecting a signal as part of the execution of the signalable sequence, thread A can identify those signalable objects that should receive a responsive signal upon completion of execution. By maintaining the intent registry, thread A knows which objects may be relied on by other threads in the event of an error. The intent registry can be useful for propagating error information to the other threads (e.g., thread B) that are expecting a signal should an error prevent thread A from sending the signal. In embodiments where the signalable object may be exclusively controlled, the step of registering intent to signal the object can include clearing any error ID that is stored in the signalable object. For example, these prior error IDs are likely the result of past errors encountered by thread A, and are likely stale. This process is similar to state 268 shown in FIG. 3B. By clearing any error ID stored in the signalable object, it prepares the object for error handling.

Once the signalable object is registered at step 420, the application dependent sequence 400 is then executed. Upon completion of the application dependent sequence, the signalable sequence determines if the application dependent sequence 400 resulted in an error, at step 422. This step can be via any conventional error detection means such as exception handling, identifying an error object created, or receiving reference to the error upon return of the application dependent sequence.

If an error is detected, execution proceeds to step 424 where the thread will examine the intent registry and can use the registered objects to propagate error information. At step 424 thread A will post the instance ID of the error (e.g., 255, FIG. 3B) encountered into each signalable object registered in the intent registry for the current thread. In this way, threads that are expecting a result in the signalable objects will be able to examine the signalable object if a signal error occurs (e.g., a time-out while waiting for a responsive signal). Accordingly, if another thread (e.g., thread B) is waiting to receive a signal via a signalable object, and waiting thread (thread B) encounters a time-out error, the waiting thread will be able to access the instance ID (e.g., 255) of the error encountered by thread A. Thread B, for instance, can use that instance ID as a parent instance ID when creating a subsequent time-out error (e.g., error 275). The instance ID of the error determined at step 422 can be the parent instance ID in any time-out errors encountered by other threads expecting a signal via the signalable object (i.e., the object registered at step 420). The error ID propagation step 424 is similar to the error ID propagation shown in FIG. 3B and a lockable object.

If, on the other hand, no error is encountered by the application dependent sequence 400, the signalable sequence proceeds to step 426 where the expected signal is sent to the signalable object. This signal may include any expected signal such as a result, object, or a confirmation. As a result of this step, any other threads that are waiting for the signal via the signalable object can complete their waitable sequence. After signaling the object, the signalable sequence proceeds to step 428 where the thread unregisters the signalable object from the intent registry. This step may include sending information to the signalable object and removing the signalable object from the list of objects in the intent registry used by thread A (or a global intent registry if used).

As a further illustration of the ability of threads to share resources and propagate and associate error information, pseudo-code may be considered. The following pseudo-code is a representation of a shared locking resource between threads where one thread currently has access to the resource (such as thread A and shared resource 260 in FIG. 3A):

```
{
    ResourceLock -> Acquire( );
    Resource -> Access( );
    .
    .
    .
    Resource -> Access( );
    ResourceLock -> Release( );
}
```

The following pseudo-code illustrates the representation provided by FIG. 3B in which an error instance ID (e.g., 255) is created when thread A, for example, encounters an error:

```
{
    ResourceLock -> Acquire( );
    // Catch any errors that occur while accessing the resource
so we can do error link processing and error handling.
    try
    {
        Resource -> Access( );
        .
        .
        .
        Resource -> Access( );
    }
    catch( Error )
    {
        ResourceLock -> SetErrorInstanceId( Error ->
        GetInstanceId( ) );
    }
    ResourceLock -> Release( );
}
```

The following pseudo-code illustrates the representation provided by FIG. 3B in which an error instance ID (e.g., 255) is created and also maintained in an intent registry:

```
{
    // Add the lock to the intent registry when it is acquired.
    ResourceLock -> Acquire( );
    IntentRegistry -> Add( ResourceLock );
        // Catch any errors that occur while accessing the
resource so we can do error link processing and error handling.
    try
    {
```

```
                Resource -> Access( );
                .
                .
                .
                Resource -> Access( );
            }
            catch( Error )
            {
                IntentRegistry ->
SetErrorInstanceIdOnAllObjectsInRegistry( Error ->
GetInstanceId( ) );
            }
            // Remove the lock from the intent registry when it is
            released.
            IntentRegistry -> Remove( ResourceLock );
            ResourceLock -> Release( );
        }
```

Similarly, the following pseudo-code is provided to reflect a signalable object (i.e., an object that allows one thread to pass information to another thread):

```
            {
                Resource -> Access( );
                .
                .
                .
                Resource -> Access( );
                SignalableObject -> SetSignal( );
            }
```

The following pseudo-code illustrates the representation in which an error instance ID is created upon a thread encountering an error when accessing a signalable object:

```
        {
            // Intent to signal the SignalableObject is implicitly acquired at
            this point because
            // the code "knows" that it is going to signal the object below.
            // Catch any errors that occur while accessing the resource so we
can do error link processing and error handling.
            try
            {
                Resource -> Access( );
                .
                .
                .
                Resource -> Access( );
            }
            catch( Error )
            {
                SignalableObject -> SetErrorInstanceId( Error ->
                GetInstanceId( ) );
            }
            SignalableObject -> SetSignal( );
        }
```

The following pseudo-code illustrates the representation in which an error instance ID is created and also maintained in an intent registry upon a thread encountering an error when accessing a signalable object:

```
        {
            // Intent to signal the SignalableObject is acquired at the
point that we know we're on a path to signal it.
            IntentRegistry -> Add( SignalableObject );
            // Catch any errors that occur while accessing the resource
so we can do error link processing and error handling.
            try
            {
```

```
                Resource -> Access( );
                .
                .
                .
                Resource -> Access( );
            }
            catch( Error )
            {
                IntentRegistry ->
SetErrorInstanceIdOnAllObjectsInRegistry( Error -> GetInstanceId( ) );
            }
            SignalableObject -> SetSignal( );
            IntentRegistry -> Remove ( SignalableObject );
        }
```

FIG. 4C shows the waitable sequence 408 that is performed by a thread (such as thread B) that is waiting for a signal via a signalable object. At step 430, the waitable sequence begins to wait on a signalable object. This step can include identifying the signal object that will contain the expected signal and can include beginning a watchdog timer to throw an error if a wait period is exceeded. In some embodiments, the waitable sequence will stall at step 430 until either a signal is obtained via the signalable object or the wait period times out. At step 432, the waitable sequence determines if a time-out error has occurred. At step 434, the waitable sequence will create a time-out error object (e.g., error 275, FIG. 3B). This object will include a unique instance ID for this error. At step 436, the waitable sequence will determine if a parent instance ID (e.g., 255) can be obtained from (e.g., thread A) the signalable object. If an error ID has been placed in the signalable object by thread A (e.g., at step 424, FIG. 4B), then this parent error ID can be included in a time-out error object created at step 434. The waitable sequence will return if the signal has been received or the wait period has timed out and an error object has been created.

Figure 4D:
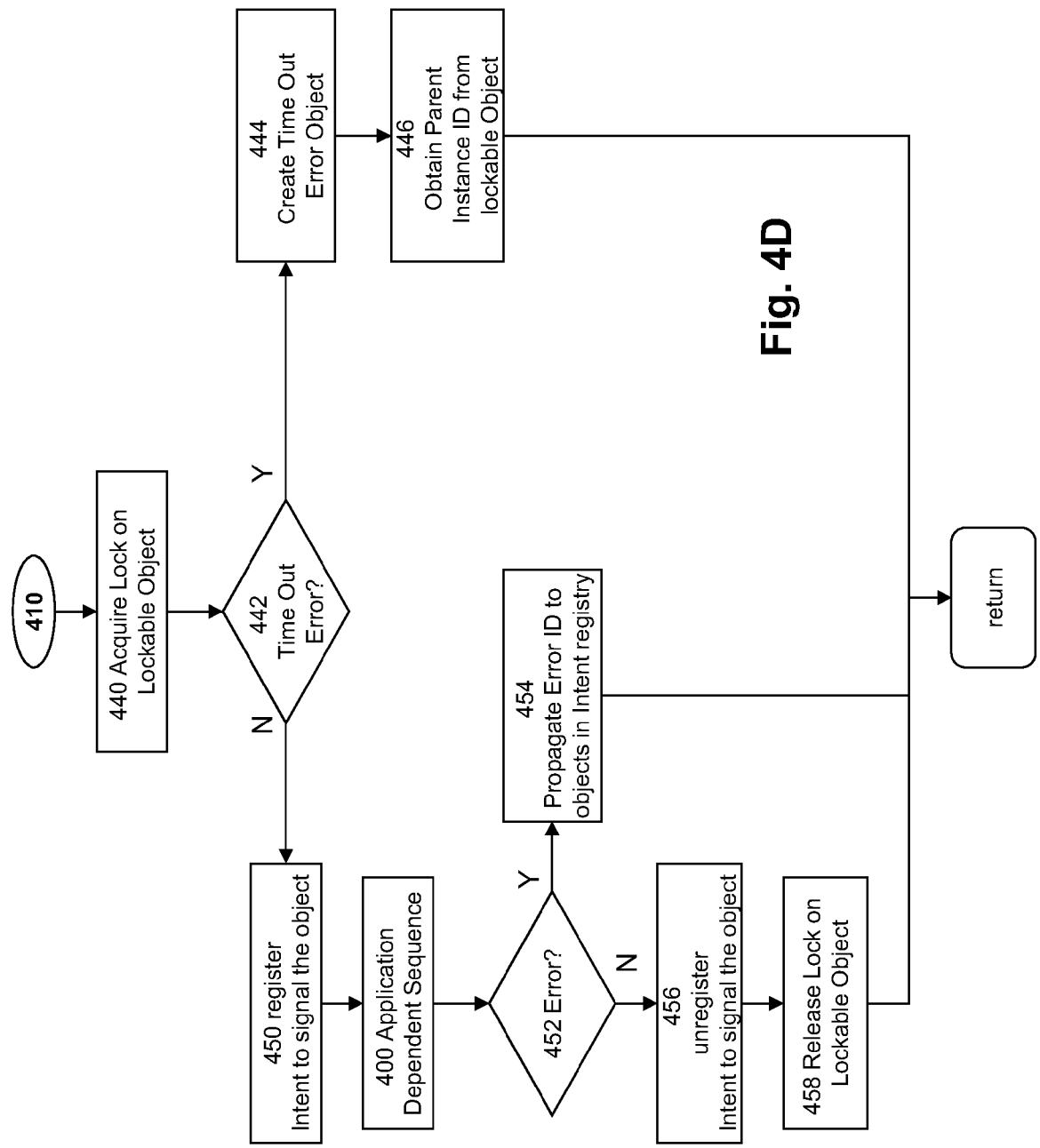

Lockable sequence 410 is executed by thread A when interacting with a lockable object (e.g., resource 260, FIGS. 3A and 3B) and is depicted in FIG. 4D. As discussed above with respect to signalable sequence 406, lockable sequence 410 represents a unit of work when dealing with a lockable object. At step 440, thread A attempts to acquire a lock on a lockable object. An example of this step includes sending an acquire request 252 in FIG. 3A. In some instances, thread A may sit idle while waiting for access to a lockable object. Thread A may also start a watchdog timer to determine if a time-out occurs. Under normal operation, as shown in FIG. 3A, when the lockable object is ready it will grant the lock to the thread (e.g., transitioning from state 262 to state 264).

At step 442, thread A determines whether it has been granted exclusive access to the lockable object or whether a time-out error has occurred A time-out error may occur if the thread has not been granted access within a predetermined time period (e.g., error 275, FIG. 3B). At step 444, if a time-out error occurs, thread A will act like thread B shown in FIG. 3B. Thread A can create a new time-out error object (e.g., error object 275 that was created by thread B in the example in FIG. 3B). Thread A can then obtain a parent instance ID placed in the lockable object (e.g., 260) by a thread that may have locked the object and encountered an error. This allows thread A to associate the new time-out error (e.g., 275) with any error (e.g., 255) that prevented thread A from acquiring the lockable object. This process is similar to that shown in FIG. 4C with respect to a signalable object.

If thread A has been granted access to the lockable object without encountering a time-out error, at step 442, thread A will then acquire the control of the lockable object. Acquisition can be by any suitable method such as changing an ownership attribute in the object, registering an active relationship between thread A and the object, setting a semaphore, or the like. At step 450, the thread will register its intent to unlock the object with the intent registry to identify the lockable object as locked by thread A. This registry may be the same as the intent registry discussed above with respect to signalable objects, or may be maintained as a separate unlock intent registry (for ease of reference, this list will be referred to as a common intent registry). As described above, the intent registry includes those objects that should be notified by thread A if an error occurs. In addition, thread A may clear any previously entered error IDs from the lockable object to prevent any other threads that are waiting for a lockable object from processing subsequent time-out errors using stale parent error information. In some embodiments, at step 450, thread A may set an ownership attribute in the lockable object to the thread ID of thread A so that any potential time-out errors can be traced to a time-out that occurred while thread A had control of the lockable object, even where thread A did not encounter an error. This information may be useful for determining the conditions encountered by a subsequent thread if a time-out error is identified as the root cause error.

After acquiring a lockable object, thread A can then execute any application dependent sequence necessary to perform the lockable sequence. This can invoke another application dependent sequence to carry out any routines that should be executed while thread A has control of the lockable object. At step 452, thread A determines whether or not the application dependent sequence 400 resulted in any errors. If so, at step 454 thread A will propagate information about error (e.g., 255, FIG. 3B) to the objects in the intent registry registered for thread A. At step 454, thread A can store the instance ID of the error (e.g., 255) to any lockable objects to which thread A has acquired control, including those in the intent registry and any other objects that may be specified in the lockable sequence instructions. This will enable propagation of the instance ID of the error encountered during the application dependent sequence 400, such that any other threads (e.g., thread B) encountering time-out errors (e.g., 275) while waiting for the lockable object can identify the error (e.g., 255) encountered by thread A as the parent error to the resulting time-out error.

At step 456, if no error was encountered during the application dependent sequence, thread A may unregister (e.g., remove) the lockable object from the thread's intent registry. This will prevent thread A from propagating an error ID to lockable objects that are no longer locked. At step 458, the thread will release the lockable object, such as by sending a release signal 254 (FIGS. 3A and 3B). As part of this step, thread A or the lockable object can remove any identification of thread A from the lockable object. This can prevent subsequent time-out errors from being associated with the current thread after it has released control of the lockable object.

Figure 4E:
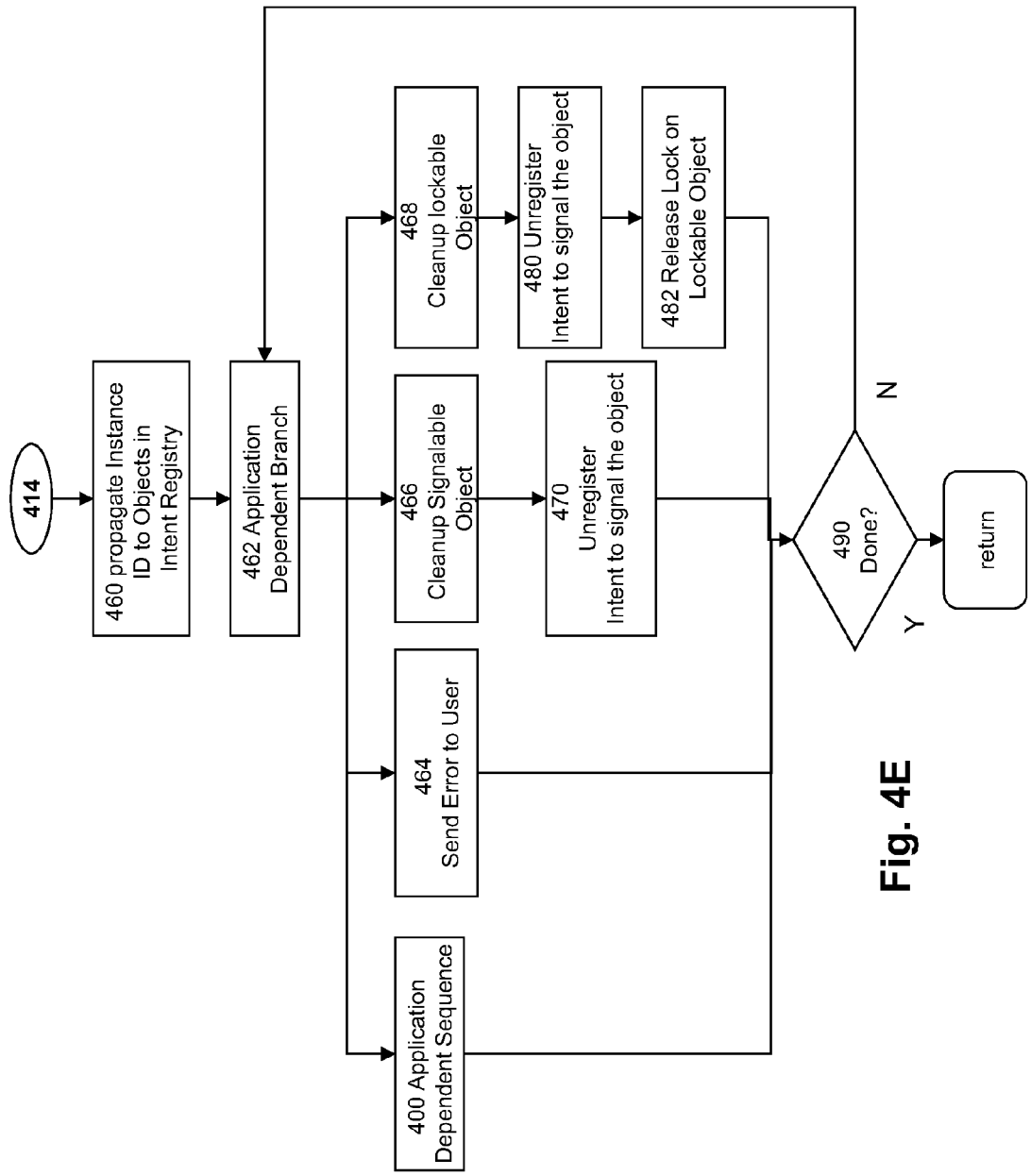

FIG. 4E depicts the procedure that an application dependent sequence will execute when handling an error at step 414. At step 460, thread A will create a new error object (e.g., 255, FIG. 3B) including a unique instance ID. Thread A will retrieve a list of the signalable and lockable objects in the intent registry. These are the objects that thread A intended to signal or unlock before encountering an error and, accordingly, these objects should be notified of the error by thread A sending the error ID to these objects. For each signalable or lockable object identifier in these lists, the error handling routines can place the instance ID of the newly created error into these objects. Alternatively, the intent registry may be used by the signalable and lockable objects to seek an error ID associated with thread A (e.g., the instance ID can be pushed to the objects or pulled by the objects in various embodiments). This allows any other threads that may be waiting on these objects and that encounter a subsequent time-out error to identify the newly created error 255 as the parent error of the subsequent time-out error (e.g., 275).

At step 462, the error handling routine 414 determines the type of error handling. For example, the error handling routines may be set up to execute an application dependent sequence 400 containing predetermined instructions. The error handling routines may also be set up to send the error to the user interface or a log file or otherwise report the error so that such an error can be later reviewed, at step 464. The reporting can include attributes of the error such as type, time stamp (if available), severity, instance ID, parent ID, and any other attributes determined to be useful. The treatment of these reported errors will be described in detail below.

When the error handling routine relates to a signalable sequence, error handling proceeds to step 466. At step 466, thread A can perform a cleanup process, such as placing a signalable object in a predetermined state for safe error handling. Once the signalable object is cleaned up, at step 470, thread A will unregister its intent to signal the signalable object in the intent registry, as the objects may no longer need to be signaled after the error. The thread may also clear any error IDs in this signal object.

When the error handling routine relates to a lockable sequence, error handling proceeds to step 468. At step 468, thread A can perform a cleanup process such as placing a lockable object in a predetermined state. Once the error has been properly handled, it may be safe to release the lock on the resource. This determination can vary by the type of error encountered. If it is safe to unlock the lockable object, thread A will unregister its intent to signal the signalable object in the intent registry at step 480. Thread A can then release the lockable object at step 482 such that another thread can control the lockable object and, by extension, the associated resource.

At step 490, the error handling routine determines if any other error handling steps are needed to complete the handling of the error. If not, the error handling routine exits.

User Interface

Figure 5A:
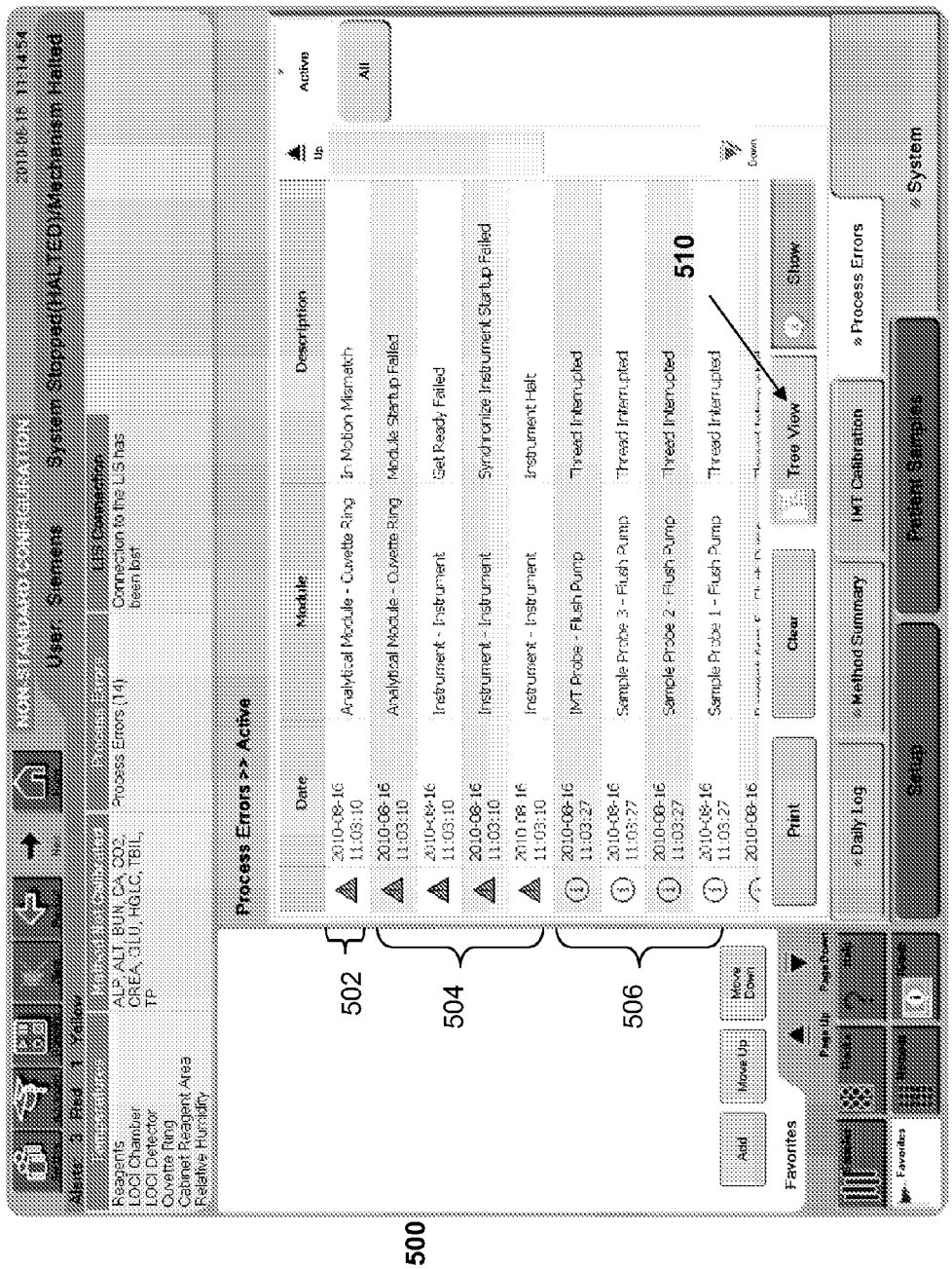
FIGS. 5A-5B are exemplary screen shots for displaying error information in accordance with illustrative embodiments.

As the system software encounters errors, these errors can be reported to the user via a user interface. This user interface can include real-time descriptions of errors, or may include storage and viewing of a log file. An exemplary user interface 500 is shown in FIG. 5A. The user interface can include any appropriate design suitable for use with the system being monitored. For example, user-interface 500 includes menus and buttons that an operator can interact with, such as via a mouse or touch screen, to control the system or view information about errors. By providing a GUI, user-interface 500 can allow an operator to easily trace, understand, and investigate errors that occur in the system during operation. An exemplary system that can be controlled by the user interface 500 includes a chemical analyzer, which is described below in further detail for illustrative purposes.

Errors shown in the example in FIG. 5A include an "in-motion-mismatch" error 502. Error 502 can occur, for example, when the main conveying mechanism in the unit encounters positional errors. This may occur during a startup calibration phase. As can be seen in this example, other instrument related errors 504 also occurred in the system. These errors include "module startup failed," "get ready failed," "synchronize instrument startup failed," and "instrument halt." An experienced operator may know from experience that errors 504 likely were the result of "in-motion-mismatch" error 502. However, there is nothing in this example that necessarily conveys this information to the user, other than the fact that errors 502 and 504 include the same time stamp. It should be noted that this time stamp may be added by the software at the time of the creation of the error or may be added by the user interface. In addition, subsequent errors 506 occurred in various sample probes that expected to use the main conveying mechanism. In this example, errors 506 are the result of the threads controlling the probes that were interrupted by a halt instruction. Again, an experienced operator may be able to determine that errors 506 are related to error 502. However, this information is not necessarily conveyed by the user interface 500.

Figure 5B:
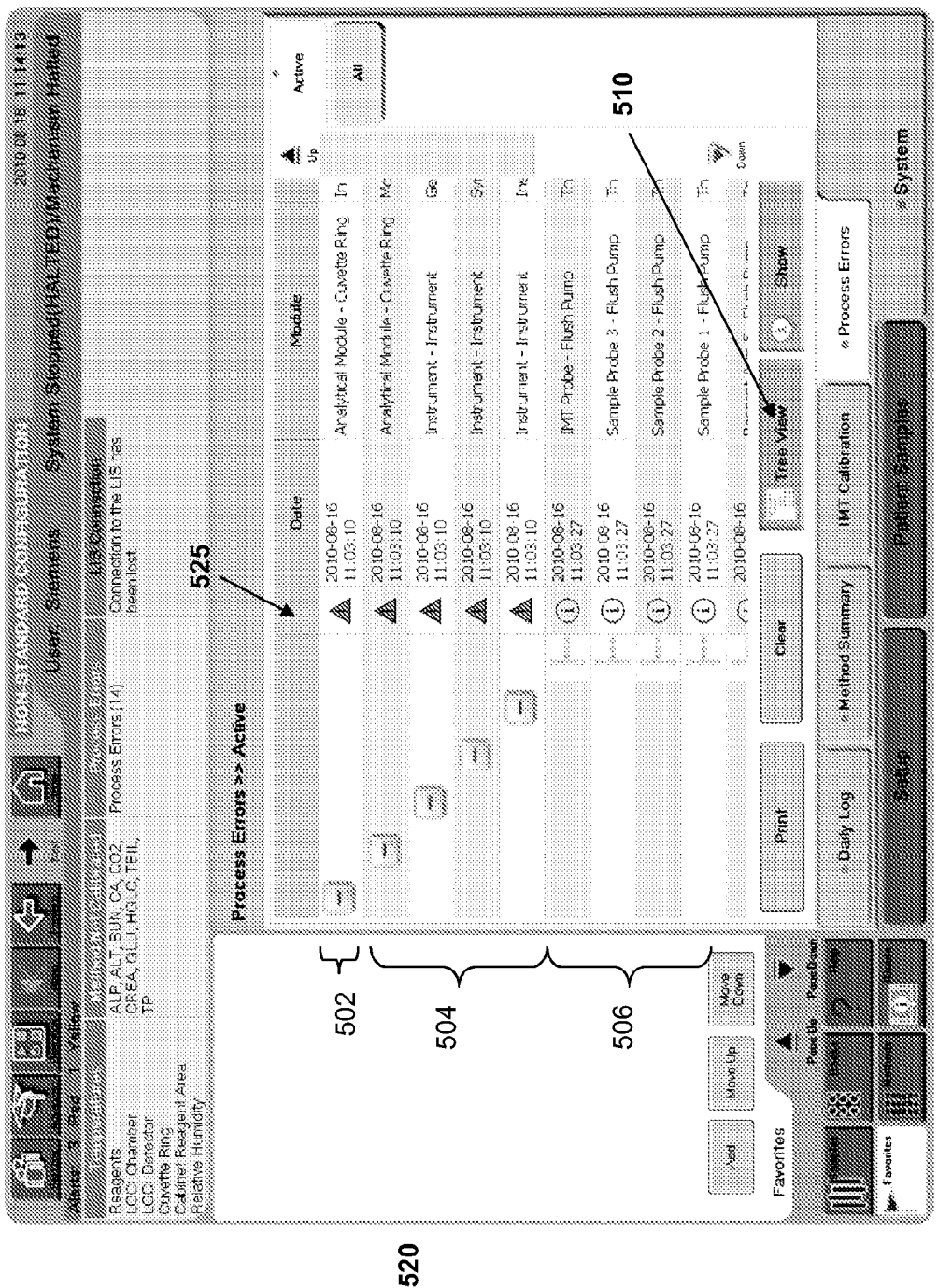

In the illustrated embodiment depicted in FIGS. 5A and 5B, a tree view button 510 is included to enable the user to toggle the display 500 and show the relationships between errors 502, 504, and 506 in a more meaningful manner, such as a tree graph. This tree graph is depicted in FIG. 5B in the screen 520. Screen 520 shows the errors in a parent-child matter. As indicated by the hierarchy on the side of the errors, errors 506 are the children of the last error in group 504. This tree may be created using the instance ID and parent instance ID information that was conveyed when the errors were reported. Assembling this information into a linked list, and thereby a tree, can be done in any manner that should be well known to a person having ordinary skill in the art.

As can be seen in screen 520, in tree form, an operator can tell at a glance that error 502 is likely the root cause of all the errors on the screen. Even an inexperienced operator can easily make this determination.

In addition, column 525 may include severity information to indicate the severity of the errors encountered. User interface screen 520 can include filter preferences that enable a user to mask less-severe errors. The severities of these errors can be conveyed in any reasonable manner, such as a numeric value, a range, a shape, a symbol, color, motion, size, brightness, etc. It is worth noting that in exemplary screen 520, errors 504, which are children of error 502, have been displayed with a higher level of severity than root cause error 502. It is important to note that the root cause error may not be considered by the system automatically to be the most severe error. Therefore, as explained in detail below, simply filtering the display of errors based on an initial severity determination may not be sufficient to inform the operator of a root cause error.

Figure 6A:
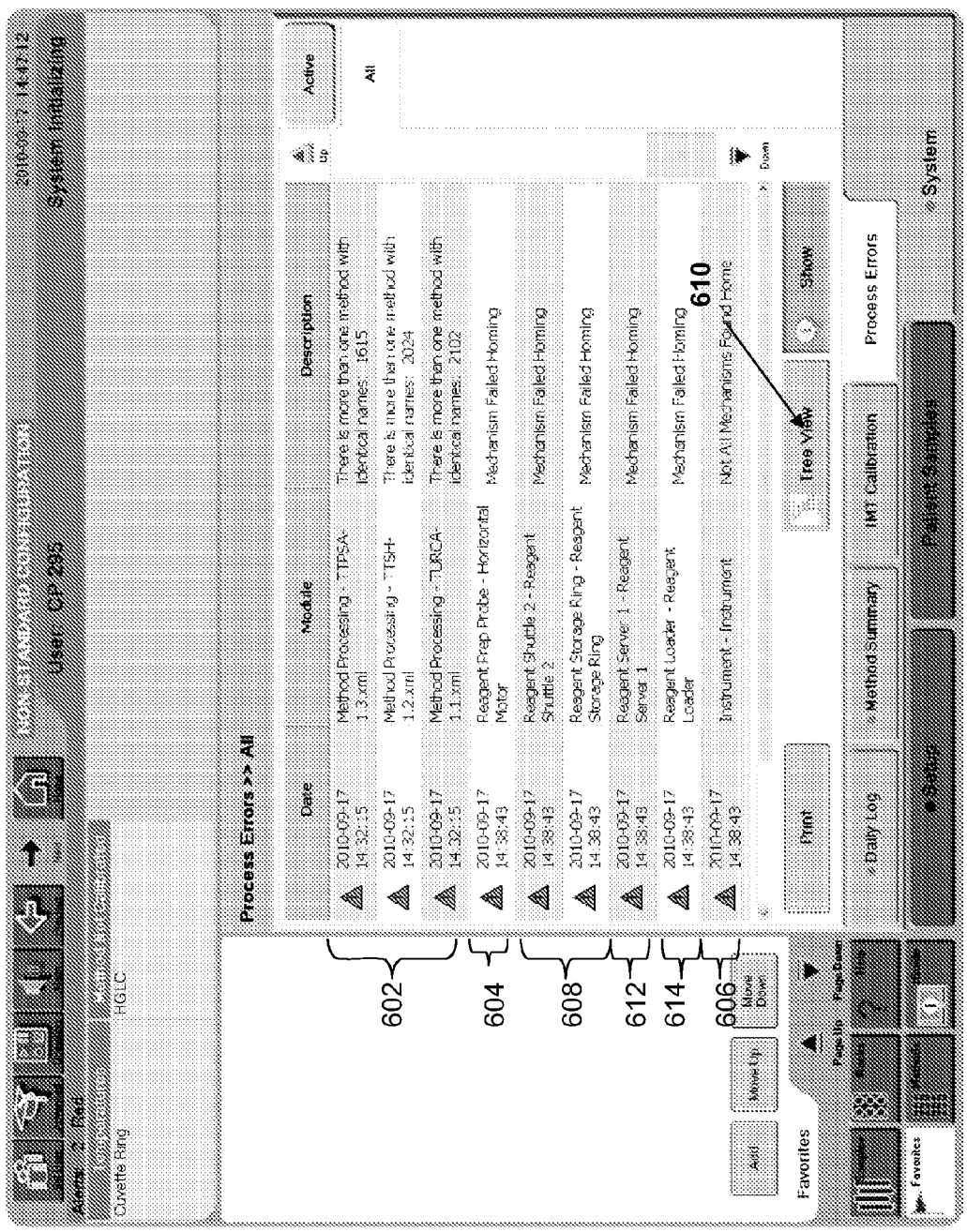
FIGS. 6A-6B are exemplary screen shots for displaying error information in accordance with illustrative embodiments.
Figure 6B:
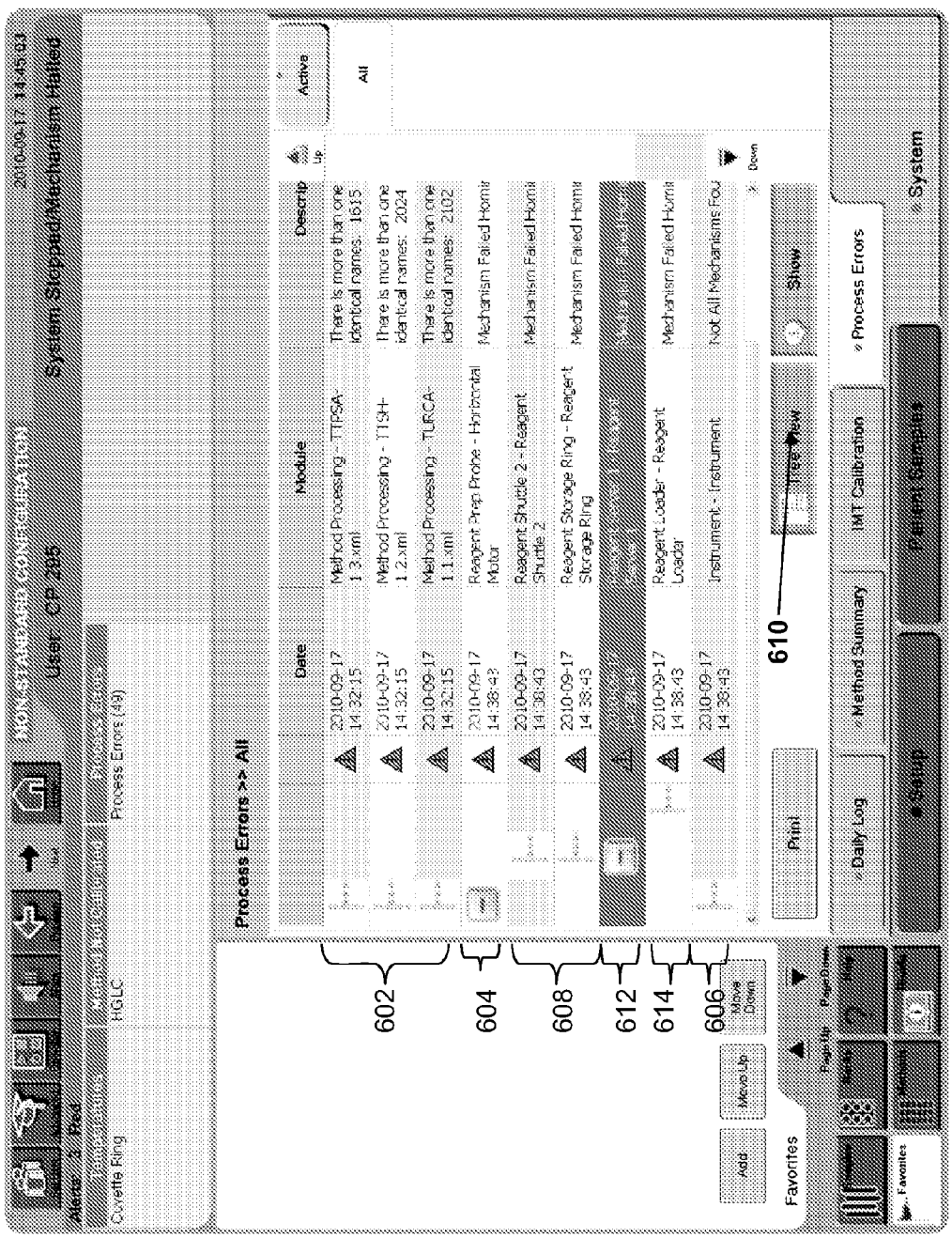

A more complex example of errors that can be displayed via a user interface is shown in FIGS. 6A and 6B. In user interface screen 600, a flat view of errors is displayed that includes method processing errors 602 that occurred a few minutes prior to a series of the homing failures 604, 608, 608, 612, and 614. In addition, a system-wide error 606 was thrown simultaneously to the homing errors, to indicate that not all mechanisms were homed properly. From this information, it is difficult to determine which errors are related and, particularly, which errors are likely root cause errors. For example, it is unclear if the method processing errors 602 led to the homing error 604, etc.

By switching to a tree view via button 610, a user may display a graph of the parent-child relationships to better understand what happened. As shown by the user interface screen 620 in FIG. 6B, the system did not detect a relationship between method processing errors 602 and the homing error 604, etc. However, from the parent-child information contained in the reported errors, it can be shown that the homing error 614 in the reagent loader was a result of error 612 in a reagent server. Errors 608 and 612 were the result of parent error 604 in the reagent prep probe. Errors 602, 604, and 606 appear not to have any parents. Therefore, an operator can readily identify these errors as possible root cause errors.

FIG. 7A shows an exemplary graph 700 of errors that result from three separate motor errors 702, 704, and 706 that may have occurred on the same mechanism within the system (e.g., at different times). In this example, root cause error 702 resulted in several children errors 712 in several mechanisms within the system, including mechanism A, which experienced root cause motor error 702. Several of the children errors 712 have their own children errors. For example, motor error 702 caused a home failure in mechanism A, which caused a startup failure for the entire instrument, which caused a halt-instrument error for the entire instrument, which caused a halt mechanism error in mechanism B, which in turn caused an abort error in mechanism B. When presented in the form shown in FIG. 7A, it is easy to determine that the root cause error is 702. An operator can essentially ignore children 712 when determining the root cause error. If these errors were viewed without relationships, in a flat manner, it may be difficult to determine root cause error 702.

When introducing the concept of severity to these errors, it may frustrate the creation of the graph 700. For example, if we apply severity levels described below to the example in FIG. 7B, we see that not all errors within the same tree include the same severity. In particular, root cause error 702 has a severity level of three, which is less than that of several of its children (and grandchildren) errors in group 712. If a user were to attempt to filter out any errors with a severity of less than "4," only those errors bolded in graph 700 would be displayed. In particular, root cause errors 702, 704, and 706 would not be displayed. The result is that, without further modification, the filtering approach may make it difficult to determine root cause errors (e.g., they may not be displayed).

To solve this problem, some embodiments propagate children severities up to parents once a graph of errors is compiled. These embodiments can use a rule (explained in FIG. 8) whereby, if a child severity is greater than the severity of the parent error, the parent error may "inherit" the greatest severity among its children. If, on the other hand, the parent severity is greater than each of its children error severities, children error severities will not be propagated up to the parent, because this could reduce the severity of the parent error to undesirable effect.

This concept is illustrated in FIG. 7C. In FIG. 7C, each error is shown with both the original severity (in parentheses) and the resulting propagated severity [in brackets]. Reasons for changes in each exemplary parent are also shown. In FIG. 7C, errors having severity above the threshold (i.e., "4" and up) are shown in bold. Note that some errors, including root cause errors 702 and 704, inherited severities above this threshold. This allows these errors to be displayed where these errors would otherwise have been masked. Errors with a new severity that is now above the display threshold, where previously it was below, are underlined to show the effect of the severity inheritance vs. that shown in FIG. 7B. This allows root cause errors 702 and 704 to be properly displayed to the user who has elected to filter out errors of a severity below a threshold of "4."

Figure 7D:
Figure 8:
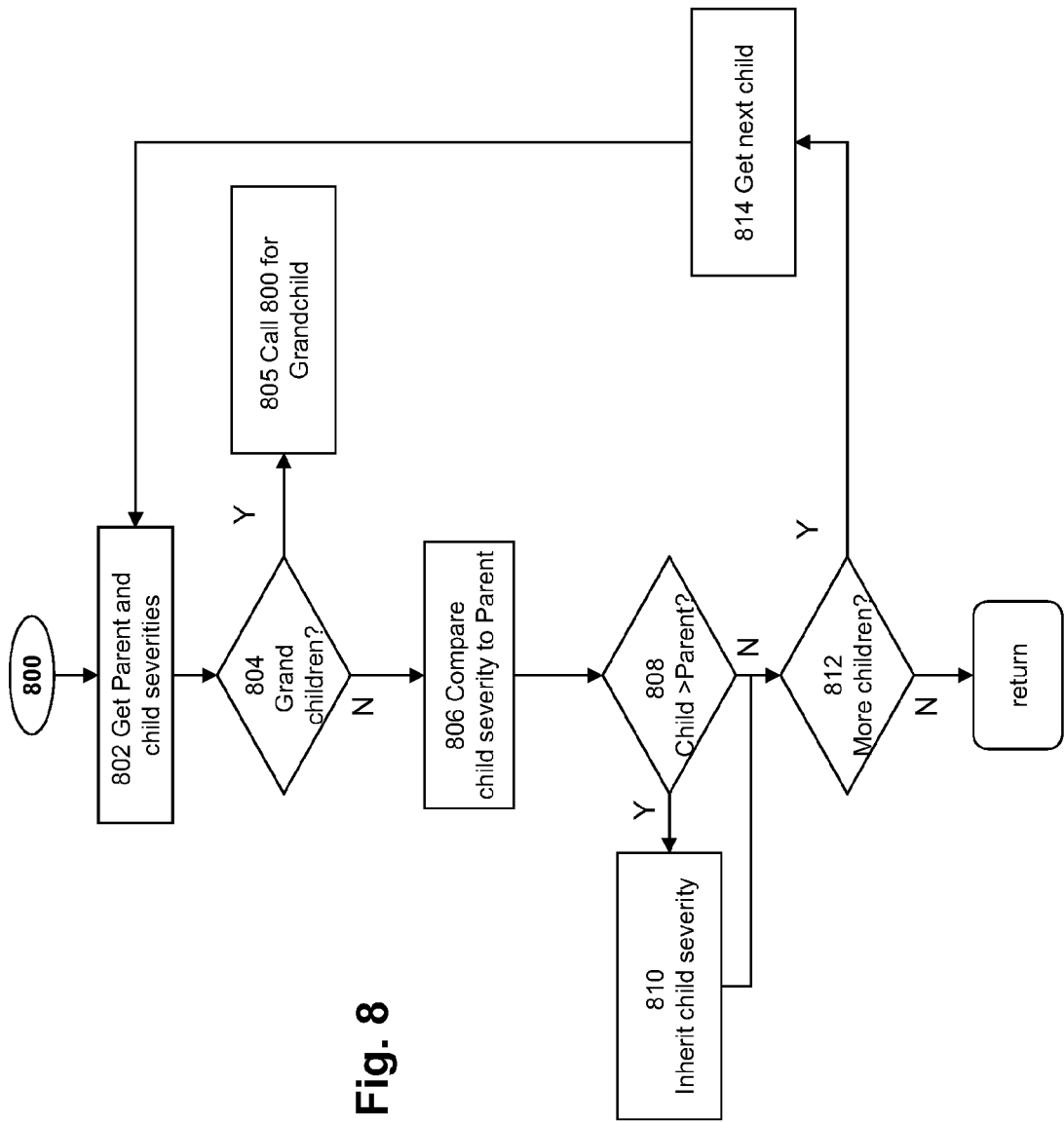
FIG. 8 is a flow chart illustrating an algorithm for executing propagating severity of errors in accordance with illustrative embodiments.

FIG. 8 shows the algorithm for propagating child severities to parents, such that less severe root cause errors are displayed if they result in more severe child errors. The routine begins at 800. At step 802, the system gathers a parent and child in the graph. At step 804 the system determines if the child has any of its own children. If so, the system recursively calls method 800 for the child and grandchild, at step 805. If no grandchildren are present, the system proceeds to step 806, where the severity of the parent and child are compared. At step 808, if the child severity is greater than the severity of the parent, the method inherits the child severity to the parent at step 810. At step 812, the method determines whether the parent has any more children. If so, the system proceeds to step 814. The method gets the next child of the parent error. This is repeated until no more child parent errors remain. The result of this process is shown in FIG. 7C.

Once error severity levels are propagated, the display can apply filters to display important errors and their parents, while masking less severe errors to reduce the noise seen by an operator. This can simplify the error display while maintaining the most important information. For example, a filter could display only those errors above a threshold severity, such as level 4. When higher severities of the children are propagated to parent errors, a simple threshold filter can produce pruned trees that include the root cause error. Alternatively, an available filter may also include logic that allows children errors to be masked when less severe than the parent error. Applying such a filter allows the user to see the most severe errors in the tree and easily trace the causality of the most severe resulting errors.

For example, FIG. 7D shows the resulting error tree applying a filter to the error tree of FIG. 7C, with a severity threshold of 4, and where child errors are masked if less severe than the adjusted severity of their parent error. In this example, the user can see that they had two major errors, what their causes were, and why each error is being displayed.

The user can be given the option to display the full error graphs for more information. This can be useful for showing all the effects from root errors, or showing any other errors that were suppressed, such as a motor error that only caused a test to quietly rerun. If the user is a non-engineer operator that does not normally care about what low-level errors caused the instrument to halt, the user can select a filtered view, such as shown in FIG. 7D, or any other appropriate filtered or pruned view.

Examples of the meanings of severity levels are shown in Table 1. Examples of errors and their default severity levels are shown in Table 2. In some embodiments, the meanings of severity levels and the associations between severity levels and errors are configurable and customizable.

TABLE 1

Exemplary Severity Levels

"Level 5" Alertable (posted error plus extra alert)
"Level 4" Postable (posted error)
"Level 3" Info Only (displayed only if Show button is pressed)
"Level 2" Info Only (displayed only if Show button is pressed)
"Level 1" Info Only (displayed only if Show button is pressed)
"Level 0" not sent up from Instrument layer—never displayed

TABLE 2

Exemplary errors and severity

| Error | Severity |
|---|---|
| InstrumentHalt | 5 |
| MechanismFailedHoming | 5 |
| ReagentAreaLidOpen | 5 |
| InstrumentLidOpen | 5 |
| TemperatureMeasurementError | 5 |
| TemperatureDeviceOpen | 5 |
| CannotInitialize | 5 |
| RemixSeekhomeFailed | 5 |
| MotorLockoutActive | 5 |
| MotorPhaseCurrentError | 5 |

TABLE 2-continued

Exemplary errors and severity

| Error | Severity |
|---|---|
| SampleAreaTemperatureHigh | 4 |
| IMTStdAAirDetectError | 4 |
| IMTCalibrationStdAAirDetectError | 4 |
| ContainersNotIdentical | 4 |
| StuckOnPosition | 3 |
| CannotFindHome | 3 |
| StuckOnHome | 3 |
| LostStepsFromHome | 3 |
| SampleAreaLidOpen | 0 |
| StepperNoMotorCurrentData | 0 |
| ThreadInterrupted | 0 |

Figure 9:
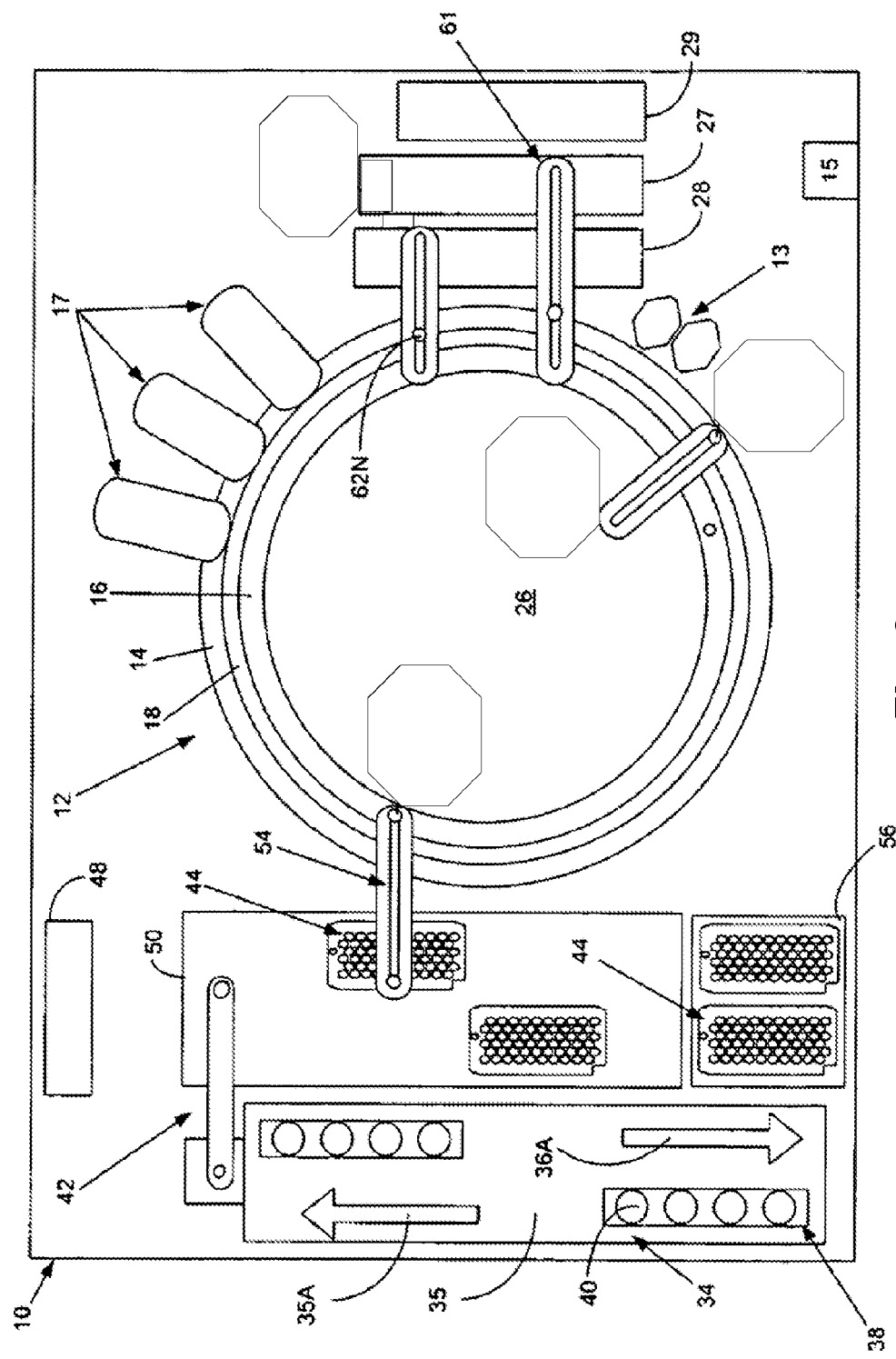
FIG. 9 is a top view of an exemplary chemical analyzer system that could employ the methods described in the embodiments described herein.

The methods discussed herein can be used in a system that encounters errors. It is well suited to hardware and software systems that include multi-threaded processes and use locks on shared resources. An exemplary system that can benefit from these techniques is the chemical analyzer shown in FIG. 9. FIG. 9 shows schematically the elements of an automatic chemical analyzer 10 in which the present invention may be advantageously practiced, which may include, for instance the chemical analyzer described in U.S. Pat. No. 7,258,480. Analyzer 10 comprises hardware, which includes a reaction carousel 12 supporting an outer cuvette carousel 14 having cuvette ports (not shown) formed therein and an inner cuvette carousel 16 having vessel ports (not shown) formed therein, the outer carousel 14 and inner carousel 16 being separated by an open groove 18. Cuvette ports are adapted to receive a plurality of reaction cuvettes (not shown) that contain various reagents and sample liquids for conventional clinical and immunoassay assays, while vessel ports are adapted to receive a plurality of reaction vessels (not shown) that contain specialized reagents for ultra-high sensitivity luminescent immunoassays.

Reaction carousel 12 is rotatable using stepwise movements in a constant direction, the stepwise movements being separated by a constant dwell time during which reaction carousel 12 is maintained stationary and computer controlled assay operational devices 13, such as sensors, reagent add stations, mixing stations, and the like, operate as needed on an assay mixture contained within a cuvette.

Analyzer 10 is controlled by software executed by a computer 15 based on computer programs written in a machine language like that used on the Dimension® clinical chemistry analyzer sold by Siemens Healthcare Diagnostics Inc. of Deerfield, Ill., and widely used by those skilled in the art of computer-based electromechanical control programming. Computer 15 also executes application software programs, such as the Dimension Vista® system software for performing assays conducted by various analyzing means (e.g., detection units) 17 within analyzer 10. Analyzing means can include, for instance, one or more photometers, turbidimeters, nephelometers, electrodes, electromagnets, and/or LOCI® readers for interpreting the results of reactions within the reaction vessels or cuvettes.

As seen in FIG. 9, a bi-directional incoming and outgoing sample fluid tube transport system 34 comprises a mechanism for transporting sample fluid tube racks 38 containing open or closed sample fluid containers such as sample fluid tubes 40 from a rack input load position at a first end of the input lane 35 to the second end of input lane 35 as indicated by open arrow 35A. Liquid specimens contained in sample tubes 40 are identified by reading bar coded indicia placed thereon using a conventional bar code reader to determine, among other items, a patient's identity, tests to be performed, if a sample aliquot is to be retained within analyzer 10, and, if so, for what period of time. It is also common practice to place bar coded indicia on sample tube racks 38 and employ a large number of bar code readers installed throughout analyzer 10 to ascertain, control, and track the location of sample tubes 40 and sample tube racks 38.

A conventional liquid sampling probe 42 is located proximate the second end of the input lane 35 and is operable to aspirate aliquot portions of sample fluid from sample fluid tubes 40 and to dispense an aliquot portion of the sample fluid into one or more of a plurality of vessels in aliquot vessel array 44. This provides a quantity of sample fluid to facilitate assays and to provide for a sample fluid aliquot to be retained by analyzer 10 within an environmental chamber 48. After sample fluid is aspirated from all sample fluid tubes 40 on a rack 38 and dispensed into aliquot vessels in array 44 and maintained in an aliquot vessel array storage and transport system 50, rack 38 may be moved, as indicated by open arrow 36A, to a front area of analyzer 10 accessible to an operator so that racks 38 may be unloaded from analyzer 10.

Sample aspiration probe 54 is controlled by computer 15 and is adapted to aspirate a controlled amount of sample from individual aliquot vessels in array 44 positioned at a sampling location within a track (not shown) and is then shuttled to a dispensing location where an appropriate amount of aspirated sample is dispensed into one or more cuvettes for testing by analyzer 10 for one or more analytes. After sample has been dispensed into reaction cuvettes, conventional transfer means move aliquot vessel arrays 44, as required, within aliquot vessel array storage and dispensing module 56 between aliquot vessel array transport system 50, environmental chamber 48, and a disposal area (not shown).

Temperature-controlled storage areas or servers 26, 27, and 28 contain an inventory of multi-compartment elongate reagent cartridges (not shown) loaded into the system via input tray 29, such as those described in U.S. Pat. No. 6,943,030 assigned to the assignee of the present invention, containing reagents in wells 32, as necessary, to perform a number of different assays. Reagents may be moved and aligned within analyzer 10 by any conventional means, including those described in 2009P13675WO, also assigned to the assignee of the present invention, and incorporated herein by reference. Computer 15 can control and track the motion and placement of the reagent cartridges. Reagents from server 27, 28, and 29 can be handled by one or more reagent probe arms, 61, 62.

The methods discussed herein are also suited to be executed by a computer. The computer implemented can be any conventional computing device, such as a PC (such as a desktop computer), server, single or multiprocessor device, handheld device (such as a phone), or device that includes different processors working together across any bus or network (such as a cloud computing environment). These computing devices can be capable of multithreaded or single threaded processing in some embodiments.

It should be noted that root cause may not necessarily be considered an error by the software. A halt button pressed by a user may be handled as an event rather than an error. Embodiments of the invention can still associate subsequent errors with this initial event. For example, events may also be given instance IDs that can be used to associate parent child relationships. It should be understood that the matters discussed herein can be used for associating events, as well as errors.

It should also be noted that a single root cause error may cause one or more child errors and each child error may also include other child errors. Accordingly, by associating child and parent errors, it is possible to create a tree graph that can be used to easily determine root cause errors. It should be noted that in some systems errors may have more than one parent error. Objects presenting these errors can include attributes that identify more than one parent. Accordingly, the resulting graph may be more complicated than a tree. Some embodiments can handle a more complicated graph. However, examples used herein refer to the simple case of a tree for simplicity. These methods should not be considered limited to trees and can be easily applied to multi-parent graphs.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for reporting errors in a software environment, comprising:
generating a first error by a first software thread, including a first error identifier (ID), in response to a first error condition relating to a state of at least one resource;
propagating the first error ID to at least one second software thread, that subsequently accesses the at least one resource, via an object that represents the at least one resource;
generating a second error by the at least one second software thread, including a second error ID and the first error ID, in response to a second error condition relating to a state of the at least one resource; and
reporting the first and second errors and their relationship to a user.

2. The method of claim 1, wherein the step of reporting comprises reporting the errors to a user interface.

3. The method of claim 1, wherein the first and second error IDs comprise unique identifiers.

4. The method of claim 1, further comprising:
propagating the first error ID to at least one third software thread;
generating a third error by the at least one third software thread, including a third error ID and at least one of the first or second error IDs; and
reporting the third error to the user.

5. The method of claim 1, wherein the step of propagating the first error ID further comprises updating an attribute in a software object that is accessible to both the first and the at least one second software threads.

6. The method of claim 5, further comprising maintaining a list of software objects that will have the attribute updated in the event of a first error.

7. The method of claim 5, wherein the software object comprises a lock such that only one of the first and the at least one second software threads is to control the at least one resource at any given time.

8. A method for reporting errors in a software environment, comprising:
requesting, by a first software thread, access to a shared resource guarded by a software object controlled by a second software thread;
determining, by the first software thread, whether a timeout condition has occurred while the first software thread is awaiting access to the shared resource;

generating, by the first software thread, an error in response to the determining step, including a first error that includes a first error identifier (ID);

obtaining, by the first software thread, from the software object a second error ID associated with the second software thread;

associating the first and second error IDs; and reporting the first error along with an association between the first and second error IDs to a user.

9. The method of claim 8, wherein the step of reporting includes reporting the errors to a user interface.

10. The method of claim 8, wherein the first and second IDs comprise unique identifiers.

11. The method of claim 8, further comprising updating information in the software object, by the second software thread, to include the second error ID when the second software thread encounters an error while the second software thread has control over the software object.

12. The method of claim 8, wherein the software object comprises a lock and is configured such that only one of the first and second software threads can access the shared resource at any given time.

13. The method of claim 8, wherein the software object comprises a software signalable object that propagates a signal from the second software thread to the first software thread upon completion of an instruction sequence by the second software thread.

14. The method of claim 8, wherein the shared resource comprises at least one of: (i) a shared software resource; and (ii) a shared hardware resource.

15. The method of claim 1, further comprising:

gathering a plurality of errors, including the first and second errors, representing hardware or software error conditions;

associating the plurality of errors into a graph to convey causal relationships amongst the errors, including at least one parent error and one or more child errors, wherein causal relationships are determined based on identities within the errors; and displaying the graph of errors to a user.

16. The method of claim 15, wherein each of the plurality of errors has a predetermined severity.

17. The method of claim 16, wherein the step of displaying includes determining a severity of each of the plurality of errors and displaying those errors that have a severity above a threshold.

18. The method of claim 17, wherein the step of displaying further includes displaying at least one parent error where at least one of the one or more child errors exceeds the threshold.

19. The method of claim 18, wherein at least one parent error is assigned at least the highest level of severity determined for the one or more child errors.

20. The method of claim 19, wherein one or more child errors are masked when an assigned severity of at least one parent exceeds an assigned severity of the one or more child errors.

* * * * *